United States Patent
Liu et al.

(10) Patent No.: US 12,339,503 B2
(45) Date of Patent: Jun. 24, 2025

(54) LIGHT SOURCE MODULE, MATCHING SOCKET FOR LIGHT SOURCE MODULE, AND OPTICAL SIGNAL TRANSMISSION METHOD

(71) Applicant: RUIJIE NETWORKS CO., LTD., Fujian (CN)

(72) Inventors: Jingwei Liu, Fujian (CN); Zhan Su, Fujian (CN)

(73) Assignee: RUIJIE NETWORKS CO., LTD., Fujian (CN)

( * ) Notice: Subject to any disclaimer, the term of this patent is extended or adjusted under 35 U.S.C. 154(b) by 0 days.

(21) Appl. No.: 18/618,242

(22) Filed: Mar. 27, 2024

(65) Prior Publication Data

US 2024/0231018 A1    Jul. 11, 2024

Related U.S. Application Data

(63) Continuation of application No. PCT/CN2023/122962, filed on Sep. 28, 2023.

(30) Foreign Application Priority Data

Sep. 28, 2022 (CN) .......................... 202211188064.X

(51) Int. Cl.
*G02B 6/42* (2006.01)
*G02B 6/38* (2006.01)
*H04B 10/40* (2013.01)

(52) U.S. Cl.
CPC ......... *G02B 6/4219* (2013.01); *G02B 6/3893* (2013.01); *H04B 10/40* (2013.01)

(58) Field of Classification Search
CPC ..... G02B 6/4219; G02B 6/3893; H04B 10/40
See application file for complete search history.

(56) References Cited

U.S. PATENT DOCUMENTS

| 2012/0148254 A1* | 6/2012 | Yamauchi | H04B 10/40 398/135 |
| 2013/0087690 A1* | 4/2013 | Sloey | G02B 6/262 250/216 |

(Continued)

FOREIGN PATENT DOCUMENTS

| CN | 202978946 U | 6/2013 |
| CN | 110768743 A | 2/2020 |

(Continued)

OTHER PUBLICATIONS

International Search Report, issued Dec. 11, 2023, in corresponding International Application No. PCT/CN2023/122962; 16 pages.

*Primary Examiner* — Uyen Chau N Le
*Assistant Examiner* — Hoang Q Tran
(74) *Attorney, Agent, or Firm* — Maier & Maier, PLLC

(57) ABSTRACT

A light source module, including: a housing, with an accommodating cavity disposed in the housing; a light source, located in the accommodating cavity, and configured to emit light; a light source connector, located at a first side of the accommodating cavity, protruding from the housing, and configured to receive the light emitted by the light source and output the light; an optical signal transceiver connector, located at the first side of the accommodating cavity, protruding from the housing, and configured to perform optical signal transmission; and an optical connector adapter, located at a second side of the accommodating cavity, and configured to perform optical signal transmission with the optical signal transceiver connector, where the second side is one side opposite to the first side of the accommodating cavity. Further, provided are a matching socket and an optical signal transmission method.

23 Claims, 17 Drawing Sheets

(56) References Cited

U.S. PATENT DOCUMENTS

| | | | |
|---|---|---|---|
| 2013/0272643 A1 | 10/2013 | Traverso et al. | |
| 2014/0178009 A1* | 6/2014 | Ko | G02B 6/3897 385/77 |
| 2015/0086211 A1* | 3/2015 | Coffey | H04B 10/801 398/116 |
| 2020/0386941 A1* | 12/2020 | Kang | G02B 6/4246 |
| 2022/0291461 A1* | 9/2022 | Elsinger | G02B 6/43 |

FOREIGN PATENT DOCUMENTS

| | | |
|---|---|---|
| CN | 111142196 A | 5/2020 |
| CN | 112817098 A | 5/2021 |
| CN | 113917631 A | 1/2022 |
| CN | 114079509 A | 2/2022 |
| CN | 114690348 A | 7/2022 |
| WO | 2018125113 A1 | 7/2018 |
| WO | 2019197897 A8 | 10/2019 |
| WO | 2020083845 A1 | 4/2020 |

\* cited by examiner

Columns: 1-16

Pluggable light source module provided in this application

Conventional pluggable optical module or linear pluggable optical module

LIGHT SOURCE MODULE, MATCHING SOCKET FOR LIGHT SOURCE MODULE, AND OPTICAL SIGNAL TRANSMISSION METHOD

CROSS-REFERENCE TO RELATED APPLICATIONS

This application is a continuation of International Patent Application No. PCT/CN2023/122962, which claims priority to Chinese Patent Application No. 202211188064.X, filed with the China National Intellectual Property Administration on Sep. 28, 2022 and entitled "LIGHT SOURCE MODULE, MATCHING SOCKET FOR LIGHT SOURCE MODULE, AND OPTICAL SIGNAL TRANSMISSION METHOD", both of which are incorporated herein by reference in their entireties.

TECHNICAL FIELD

This application relates to the field of communications technologies, and in particular, to a light source module, a matching socket for a light source module, and an optical signal transmission method.

BACKGROUND

Currently, due to problems of power consumption and heat dissipation of a conventional pluggable optical module applied in a communication device (such as a switch), an architecture of the conventional pluggable optical module cannot meet development of a data center. Therefore, a pluggable light source module applicable to a Co-Packaged Optics (CPO) or Near-Packaged Optics (NPO) switch in the data center is known to be proposed in a conventional technology.

A photoelectric modulation part in the conventional pluggable optical module is implemented by an optical engine in the CPO switch or NPO switch. Light emitted by the pluggable light source module is input to the optical engine through a polarization-maintaining fiber. After the light is modulated, the optical engine transmits an output optical signal to an optical connector adapter through a single-mode fiber and outputs the optical signal through the optical connector adapter.

SUMMARY

Exemplary embodiments of this application disclose a light source module, a matching socket for a light source module, and an optical signal transmission method.

According to a first aspect, this application provides a light source module, including a housing, an optical signal transceiver connector, a light source connector, a light source, an electrical connector, and an optical connector adapter, where an accommodating cavity is provided in the housing;

the optical signal transceiver connector and the light source connector are disposed on an external part of a first side of the housing, the light source connector is configured to output light emitted by the light source to a switch, and the optical signal transceiver connector is configured to perform optical signal transmission with the switch;

the electrical connector is disposed on the external part of the first side, and the electrical connector is configured to supply power to the light source module; and the optical connector adapter is disposed on an internal part of a second side of the housing and connected to the optical signal transceiver connector in the housing through a fiber, the second side is one side opposite to the first side in the housing, and the optical connector adapter is configured to perform optical signal transmission with an external device.

In some embodiments, the light source module further includes an optical splitter, where the optical splitter is disposed between the light source and the light source connector, and configured to split the light emitted by the light source and transmit, to the light source connector, a plurality of light beams obtained after the splitting.

In some embodiments, the light source module further includes a multiplexer and a demultiplexer, where the multiplexer is located between the optical connector adapter and the optical signal transceiver connector, and configured to multiplex optical signals output by the optical signal transceiver connector and send a multiplexed optical signal to the optical connector adapter; and the demultiplexer is located between the optical connector adapter and the optical signal transceiver connector, and configured to demultiplex an optical signal output by the optical connector adapter and send demultiplexed optical signals to the optical signal transceiver connector.

In some embodiments, the light source module further includes a controller and an alarm indicator, where the controller is configured to receive matching information from the switch through the electrical connector, determine a matching result between the switch and the light source module based on the matching information, and determine a lighting mode of the alarm indicator based on the matching result.

In some embodiments, the optical signal transceiver connector and the light source connector are disposed in parallel along a first direction on the external part of the first side; and the electrical connector is stacked with the optical signal transceiver connector or the light source connector along a second direction on the external part of the first side, and the optical signal transceiver connector, the light source connector, and the electrical connector face a same direction, where the first direction is perpendicular to the second direction, the first direction and the second direction are both perpendicular to a third direction, and the third direction is a direction in which the light source module is inserted into a matching socket for the light source module.

In some embodiments, the optical signal transceiver connector is crimped to or coupled with a single-mode fiber; and the light source connector is crimped to or coupled with a polarization-maintaining fiber.

In some embodiments, in the third direction, a projection of the electrical connector in the second direction is longer than a projection of the optical signal transceiver connector in the second direction.

In some embodiments, the light source module further includes a positioning collar and a positioning guide hole, where the electrical connector is configured to perform primary positioning when the light source module is inserted into the matching socket;

the positioning collar is located at the first side, and configured to perform secondary positioning when the light source module is inserted into the matching socket; and the positioning guide hole is configured to perform final positioning when the light source module is inserted into the matching socket.

According to a second aspect, this application provides a matching socket for a light source module. The matching socket is connected to a switch. The matching socket includes an optical signal transceiver interface, a light source interface, an electrical connector, and an electrical interface, where the optical signal transceiver interface and the light source interface are disposed at one side that is of the matching socket and that is used for inserting the light source module, the optical signal transceiver interface is connected to an optical engine of the switch through a fiber and configured to perform optical signal transmission with the optical engine, and the light source interface is connected to the optical engine through a fiber and configured to transmit received light from a light source module to the optical engine;

the electrical connector is disposed at one side that is of the matching socket and that is crimped to a circuit board of the switch, and configured to supply power to the matching socket based on electrical energy provided by the circuit board; and the electrical interface is disposed inside the electrical connector, and configured to connect to an electrical connector of the light source module.

In some embodiments, the optical signal transceiver interface is crimped to or coupled with a single-mode fiber, the light source interface is crimped to or coupled with a polarization-maintaining fiber, the optical signal transceiver interface is connected to the optical engine through the single-mode fiber, and the light source interface is connected to the optical engine through the polarization-maintaining fiber.

In some embodiments, the optical signal transceiver interface and the light source interface are disposed in parallel along a first direction; and the electrical connector is stacked with the optical signal transceiver interface or the light source interface along a second direction and includes a crimping pin pointing to the second direction, where the crimping pin is configured to crimp the matching socket to the circuit board of the switch, where the light source interface, the optical signal transceiver interface, and the electrical interface face a same direction, the first direction is perpendicular to the second direction, and the first direction and the second direction are both perpendicular to a direction in which the light source module is inserted into the matching socket.

In some embodiments, the matching socket further includes a positioning pin and two springs, where the positioning pin is stacked with the optical signal transceiver interface or the light source interface along the second direction, the optical signal transceiver interface and the light source interface are located between the positioning pin and the electrical connector, and one end of the positioning pin is connected to the electrical connector; and one end of a first spring of the two springs is connected to the positioning pin, the other end of the first spring is connected to the optical signal transceiver interface, one end of a second spring of the two springs is connected to the positioning pin, and the other end of the second spring is connected to the light source interface.

In some embodiments, in a third direction, a projection of the positioning pin in the second direction is longer than a projection of the optical signal transceiver interface or the light source interface in the second direction, where the third direction is the direction in which the light source module is inserted into the matching socket.

In some embodiments, the matching socket further includes a positioning guide pin, where the electrical interface is configured to perform primary positioning when the light source module is inserted into the matching socket;

the positioning pin is configured to perform secondary positioning when the light source module is inserted into the matching socket; and the positioning guide pin is configured to perform final positioning when the light source module is inserted into the matching socket.

According to a third aspect, this application provides an optical signal transmission method, including:

receiving, by an optical connector adapter of a light source module, a first optical signal from an external device;

transmitting, by the optical connector adapter, the first optical signal to a switch through an optical signal transceiver connector of the light source module;

outputting, by a light source connector of the light source module to the switch, a light emitted by a light source of the light source module, where the light is used by the switch to perform photoelectric modulation; and when the optical connector adapter receives, through the optical signal transceiver connector of the light source module, a second optical signal returned by the switch, sending the second optical signal to the external device.

In some embodiments, before the transmitting the first optical signal to a switch, the method further includes:

demultiplexing, by a demultiplexer of the light source module, the first optical signal to obtain at least two third optical signals; and transmitting, by the optical signal transceiver connector, the at least two third optical signals to the switch.

In some embodiments, before the outputting, to the switch, light emitted by a light source of the light source module, the method further includes:

splitting, by an optical splitter of the light source module, the light emitted by the light source, to obtain a plurality of light beams; and outputting, by the light source connector, the plurality of light beams to the switch.

In some embodiments, the method further includes:

when the optical signal transceiver connector receives at least two fourth optical signals returned by the switch, multiplexing, by a multiplexer of the light source module, the at least two fourth optical signals to obtain the second optical signal; and sending, by the optical connector adapter, the second optical signal to the external device.

According to a fourth aspect, the exemplary embodiments of this application provide a light source module, including:

a housing, with an accommodating cavity disposed in the housing;

a light source, located in the accommodating cavity, and configured to emit light;

a light source connector, located at a first side of the accommodating cavity, protruding from the housing, and configured to receive the light emitted by the light source and output the light to a communication device;

an optical signal transceiver connector, located at the first side of the accommodating cavity, protruding from the housing, and configured to perform optical signal transmission with the communication device; and an optical connector adapter, located at a second side of the accommodating cavity, and configured to perform optical signal transmission with the optical signal transceiver connector, where the second side is one side opposite to the first side of the accommodating cavity.

In some embodiments, the light source module further includes: a polarization-maintaining fiber, where one end of the polarization-maintaining fiber is connected to the light source, and the other end of the polarization-maintaining fiber is connected to the light source connector; and a single-polarization fiber, where one end of the single-polarization fiber is connected to the optical connector adapter, and the other end of the single-polarization fiber is connected to the optical signal transceiver connector.

In some embodiments, the optical signal transceiver connector and the light source connector are disposed in parallel along a first direction at the first side, and the first direction is perpendicular to an insertion direction of the light source module.

In some embodiments, the light source module further includes: an optical splitter, located between the light source and the light source connector, and configured to split the light emitted by the light source to obtain a plurality of light beams.

In some embodiments, the light source module further includes: a demultiplexer, located between the optical connector adapter and the optical signal transceiver connector, and configured to demultiplex at least one optical signal output by the optical connector adapter and send a plurality of demultiplexed optical signals to the optical signal transceiver connector.

In some embodiments, the light source module further includes: a multiplexer, located between the optical connector adapter and the optical signal transceiver connector, and configured to multiplex a plurality of optical signals output by the optical signal transceiver connector and send at least one multiplexed optical signal to the optical connector adapter.

In some embodiments, the light source module further includes: an electrical connector, located at the first side of the accommodating cavity, protruding from the housing, and configured to supply power to the light source module, where the electrical connector is stacked with the optical signal transceiver connector and/or the light source connector along a second direction, and the first direction is perpendicular to the second direction.

In some embodiments, a length of a projection of the electrical connector on a projection plane formed by the second direction and the third direction is greater than a length of a projection of the optical signal transceiver connector or the light source connector on the projection plane, and the third direction is perpendicular to the first direction and the second direction respectively.

In some embodiments, the light source module further includes: a positioning collar, located at the first side, and configured to position the light source module during insertion of the light source module.

In some embodiments, the light source connector and/or the optical signal transceiver connector further include/includes: a positioning guide hole, configured to position the light source connector and/or the optical signal transceiver connector during insertion of the light source module.

In some embodiments, the light source module further includes: a microcontroller, located in the accommodating cavity, connected to the electrical connector, and configured to receive matching information from the communication device through the electrical connector; and an alarm indicator, located at the second side, connected to the microcontroller, and configured to indicate a matching status of the inserted light source module with the communication device, where the microcontroller determines a matching result between the communication device and the light source module based on the matching information, and controls a lighting mode of the alarm indicator based on the matching result.

In some embodiments, the optical connector adapter is an MPO connector or an SN connector.

In some embodiments, the light source module further includes: a protective cover, located at the first side and protruding from the housing to protect the optical signal transceiver connector and the light source connector.

According to a fifth aspect, the exemplary embodiments of this application provide a matching socket for a light source module. The matching socket is connected to a communication device and the light source module according to any one of the foregoing embodiments. The matching socket includes:

an optical signal transceiver interface, located at one side that is of the matching socket and that is used for inserting the light source module, connected to an optical engine of the communication device, and configured to perform optical signal transmission with the optical engine; and a light source interface, located at the side that is of the matching socket and that is used for inserting the light source module, connected to the optical engine, and configured to transmit received light from the light source module to the optical engine.

In some embodiments, the optical signal transceiver interface is configured to be crimped to or be coupled with a single-mode fiber, and the light source interface is configured to be crimped to or coupled with a polarization-maintaining fiber.

In some embodiments, the matching socket further includes: an electrical connector, located at one side that is of the matching socket and that is inserted and connected to the communication device, and configured to supply power to the matching socket based on electrical energy provided by a circuit board; and a positioning pin, configured as stacked with the optical signal transceiver interface and/or the light source interface along the second direction perpendicular to the first direction, where one end of the positioning pin is connected to the electrical connector, where the optical signal transceiver interface and the light source interface are located between the positioning pin and the electrical connector.

In some embodiments, the matching socket further includes: a first spring, where one end of the first spring is connected to the positioning pin, and the other end of the first spring is connected to the optical signal transceiver interface; and a second spring, where one end of the second spring is connected to the positioning pin, and the other end of the second spring is connected to the light source interface.

According to a sixth aspect, the exemplary embodiments of this application provide an optical signal transmission method, applied to the light source module according to any one of the foregoing embodiments. The method includes:

emitting, by the light source of the light source module, light to the light source connector;

outputting, by the light source connector of the light source module to the communication device, the light emitted by the light source, where a second optical signal is generated after optical-to-electrical conversion processing is performed on the light in the communication device;

receiving, by the optical signal transceiver connector of the light source module, the second optical signal returned by the communication device, and sending the second optical signal to the optical connector adapter; and sending, by the optical connector adapter, the second optical signal to the external device.

In some embodiments, before the sending the second optical signal to an external device, the method further includes: receiving, by the optical signal transceiver connector, at least two fourth optical signals returned by the communication device; and multiplexing, by the multiplexer of the light source module, the at least two fourth optical signals to obtain the second optical signal.

In some embodiments, before the outputting, by the light source connector of the light source module to the communication device, the light emitted by the light source, the method further includes: splitting, by the optical splitter of the light source module, the light emitted by the light source to obtain a plurality of light beams; and outputting, by the light source connector, the plurality of light beams to the communication device.

The light source module provided in the exemplary embodiments of this application is integrated with the light source and the optical connector adapter, so that a pluggable light source module is implemented. In addition, the light source connector and the optical signal transceiver connector are respectively disposed at a side that is of the light source module and that is inserted and connected to the communication device. In this way, a problem that a yield of fiber crimping is low due to different types of fibers used for the light source and optical signal transmission is resolved, and difficulty and costs of a fiber crimping process in the pluggable light source module are reduced.

BRIEF DESCRIPTION OF DRAWINGS

The accompanying drawings described herein are intended for better understanding of this application, and constitute a part of this application. Exemplary embodiments and descriptions thereof in this application are intended to interpret this application and do not constitute any improper limitation on this application.

DETAILED DESCRIPTION OF EMBODIMENTS

Figure 1:
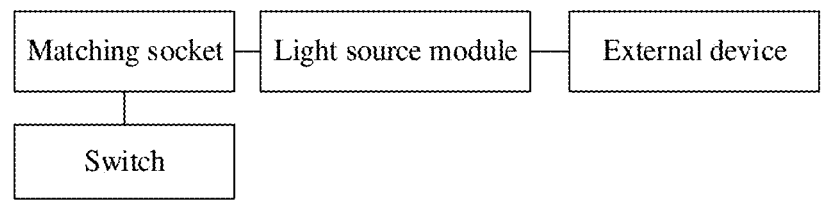
FIG. 1 is a schematic architectural diagram of a system according to an embodiment of this application.

To enable a person skilled in the art to understand the technical solutions in this application better, the following clearly and thoroughly describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

In the description of this application, it should be understood that orientations or position relationships indicated by the terms "middle", "up", "down", "front", "rear", "left", "right", "vertical", "horizontal", "top", "bottom", "inside", "outside", and the like are based on orientations or position relationships shown in the accompanying drawings, and are merely intended to simplify the description of this application for a purpose of easy description, rather than indicating or implying that an apparatus or a component must have a particular direction or must be constructed and operated in a particular orientation. Therefore, this shall not be construed as any limitation on this application.

The terms "first" and "second" are only intended to distinguish between identical or similar components, and shall not be understood as an indication or implication of relative importance or an implicit indication of a quantity of indicated technical features. Therefore, a feature defined by "first" or "second" may explicitly or implicitly include one or more features. In the description of this application, "a plurality of" means at least two unless otherwise stated.

In the description of this application, it should be noted that unless otherwise specified and defined explicitly, the terms "mount", "connect", and "join" should be understood in general senses. For example, the terms may refer to a fixed connection, a detachable connection, or an integral connection, and may refer to a direct connection, an indirect connection via an intermediate medium, or an internal connection between two components. A person of ordinary skill in the art may understand specific meanings of these terms in this application as appropriate to specific situations.

In addition, it should be noted that dimensional proportions of various components in the drawings provided in the embodiments of this application do not reflect real dimensional proportions, but are only intended to clearly express a relative position relationship between the components.

As described earlier, to ensure input and output of signals, a CPO switch needs to be configured with a structure including a pluggable light source module and an optical connector adapter. This makes plug-and-play impossible and causes poor maintainability. In addition, presence of the optical connector adapter also limits heat dissipation of the pluggable light source module, and shortens a service life of the pluggable light source module.

To facilitate understanding, first described are application scenarios of a light source module, a matching socket for a light source module, and an optical signal transmission method provided in the embodiments of this application. FIG. 1 is an architectural diagram of a system according to an embodiment of this application. The system includes a switch serving as a communication device, a light source module, a matching socket for a light source module, and an external device.

The switch shown in FIG. 1 may be a co-packaged optics (Co-Packaged Optics, CPO) switch or a near-packaged optics (Near-Packaged Optics, NPO) switch. The switch may internally include a switch chip for specific data processing, and may further include an optical engine for implementing a photoelectric modulation function. The matching socket for the light source module is configured as connected to the switch, for example, may be configured as connected to the switch in a manner of crimping. The light source module and the matching socket may be connected to each other in a manner of insertion. The light source module may be configured to implement optical signal transmission between the switch and the external device, and provide a light source for the switch to perform photoelectric modulation. The external device shown in FIG. 1 may be any communication device connected to the light source module through a fiber. Implementations of the external device are not limited in this application.

Figure 2:
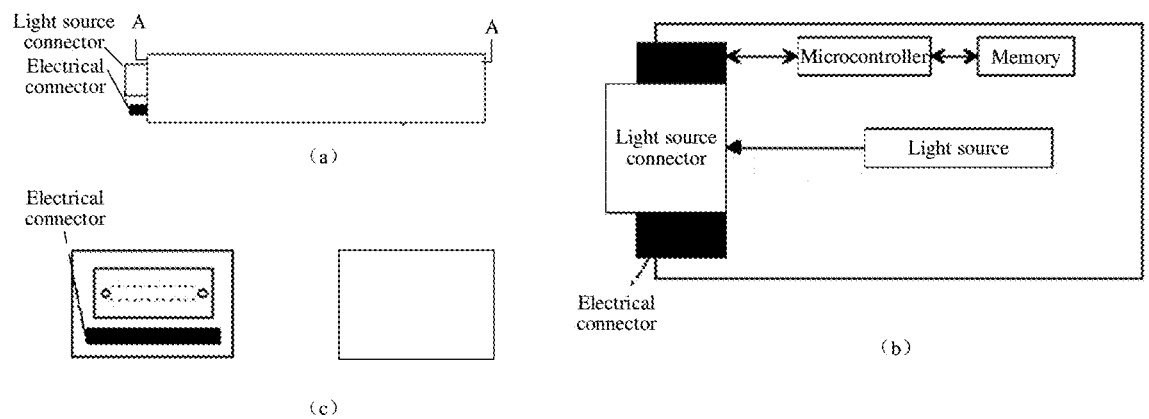
FIG. 2 is a schematic structural diagram of a pluggable light source module according to an embodiment of this application.

A schematic structural diagram of a pluggable light source module currently used for a CPO switch or an NPO switch may refer to FIG. 2. (a) in FIG. 2 is a front view of a pluggable light source module proposed in a conventional technology. (b) in FIG. 2 is a cross-sectional view of the pluggable light source module proposed in the conventional technology, along an A-A direction (top view) of the pluggable light source module in (a) in FIG. 2. (c) in FIG. 2 is a side view (including a left view and a right view) of the pluggable light source module proposed in the conventional technology. As shown in FIG. 2, the light source module proposed in the conventional technology includes structures, such as a light source, a microcontroller, a memory, a light source connector, an electrical connector, and the like and the light source connector and the electrical connector are located at the same side of the light source module. In the embodiment shown in FIG. 2, the light source module does not include any optical connector for optical signal transmission. The optical connector refers to a connector for performing optical signal transmission, and may include an optical signal transceiver connector and an optical connector adapter.

Figure 3:
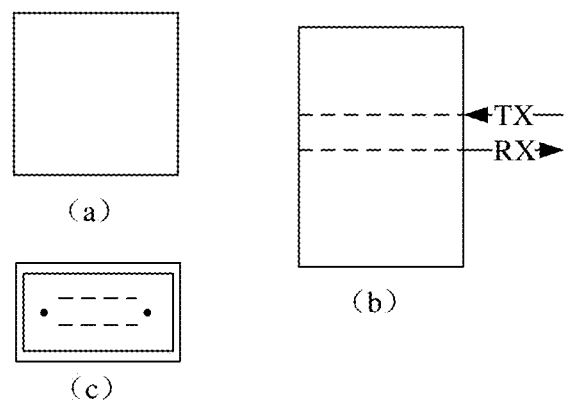
FIG. 3 is a schematic structural diagram of an optical connector adapter according to an embodiment of this application.

Therefore, to ensure normal input and output of services of the switch, the conventional technology proposes an independent optical connector adapter that is also required to be equipped with in addition to the light source module. For a schematic structural diagram of the optical connector adapter in the conventional technology, refer to FIG. 3. (a) in FIG. 3 is a front view of the optical connector adapter, (b) in FIG. 3 is a top view of the optical connector adapter, and (c) in FIG. 3 is a side view (including a right view) of the optical connector adapter.

Figure 4A:
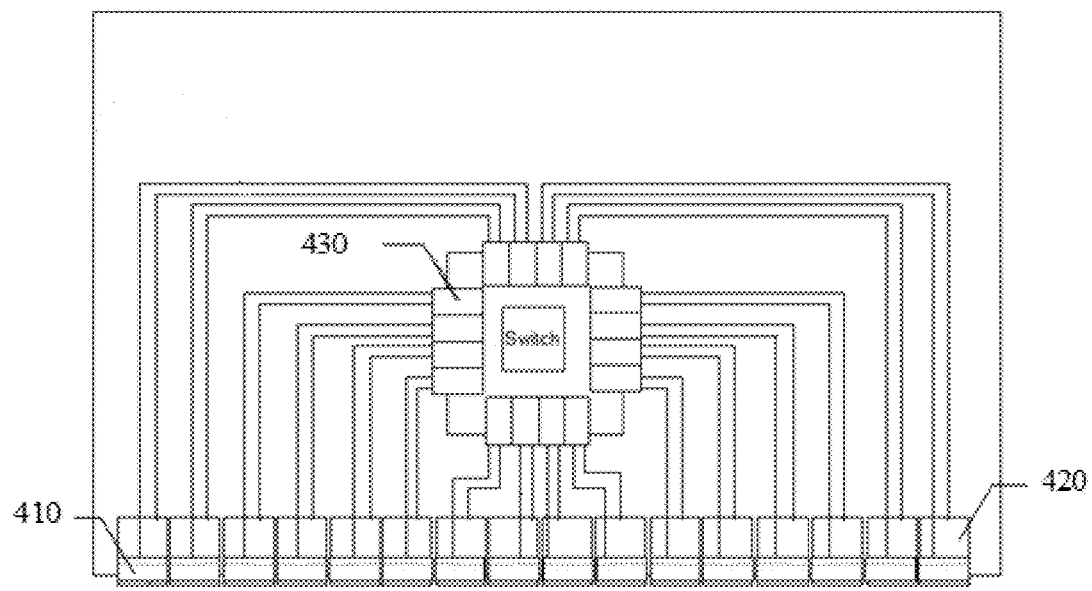
FIG. 4A is a top view of a switch system according to an embodiment of this application.
Figure 4B:
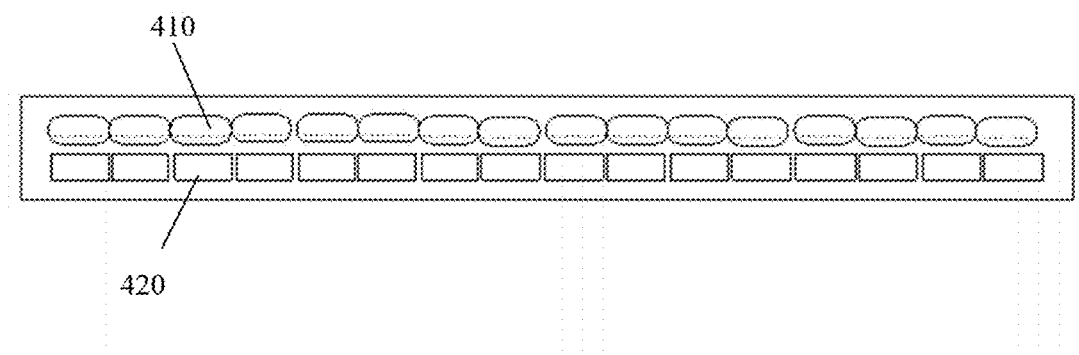
FIG. 4B is a front view of the switch system according to the embodiment shown in FIG. 4A.

To facilitate understanding of a solution of the conventional technology, FIG. 4A exemplarily shows a top view of a system that a conventional light source module 420 and a conventional optical connector adapter 410 are connected to a switch (Switch), and FIG. 4B shows a front view of the system. As shown in the figure, the light source module 420 may be connected to an optical engine 430, for example, through a polarization-maintaining fiber, and the optical connector adapter 410 may be connected to the optical engine 430 through a single-polarization fiber. However, because the optical connector adapter 410 is located at a position close to an upper side of the light source module 420, heat dissipation of the upper side of the conventional light source module 420 is limited. Therefore, a service life of the light source module 420 is shortened, and this makes plug-and-play impossible ("pluggable" cannot be implemented) and causes poor user experience.

It may be understood that the single-polarization fiber (Zing fiber) is a type of fiber that can transmit only light in a particular polarization direction, and light in other polarization directions does not meet a waveguide condition or has a very high optical loss. By introducing birefringence, the polarization-maintaining fiber (Polarization-maintaining fiber) maintains birefringence in each position in an axial direction of the fiber, thereby maintaining a polarization state of incident light. To be specific, the polarization-maintaining fiber can transmit light in any polarization state, but when a polarization direction of the light is adjusted to be parallel with an axis of birefringence, the fiber can maintain the linear polarization state.

Exemplary embodiments of this application provide a light source module and a matching socket. The light source module is integrated with a light source and an optical connector adapter, meeting a plug-and-play (that is, pluggable) use requirement. In addition, because different fibers are used for the light source and optical signal transmission, a yield of unified interface crimping is reduced. Therefore, using different optical interfaces for transmission of the light source and optical signals can also reduce process difficulty and costs.

The following describes in detail the light source module, the matching socket for the light source module, and the optical signal transmission method provided in the exemplary embodiments of this application.

Figure 5A:
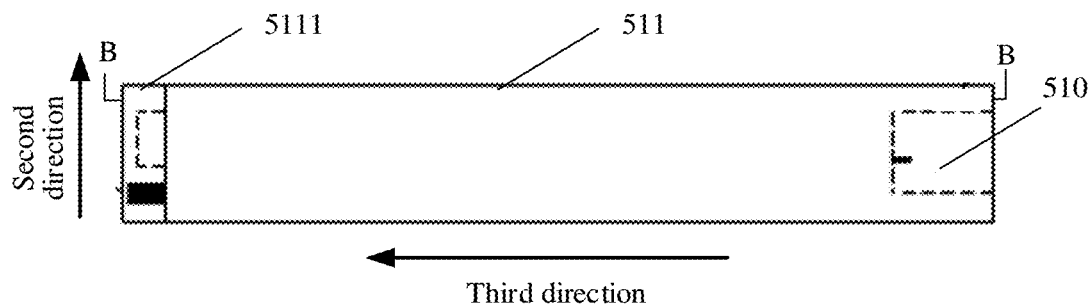
FIG. 5A is a front view of a light source module according to an embodiment of this application.
Figure 5B:
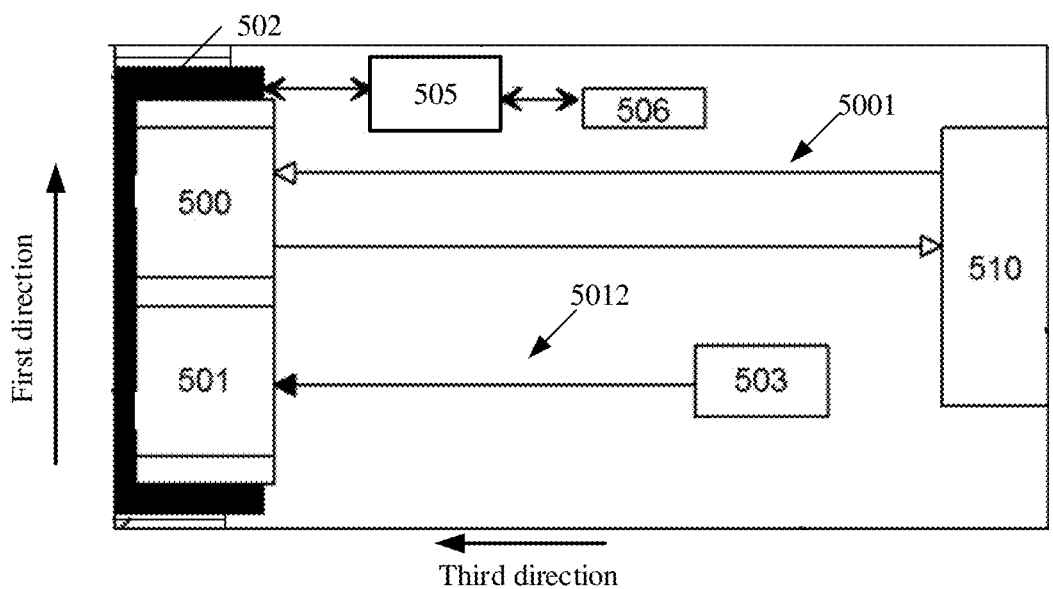
FIG. 5B is a cross-sectional view of the light source module according to the embodiment shown in FIG. 5A.
Figure 5C:
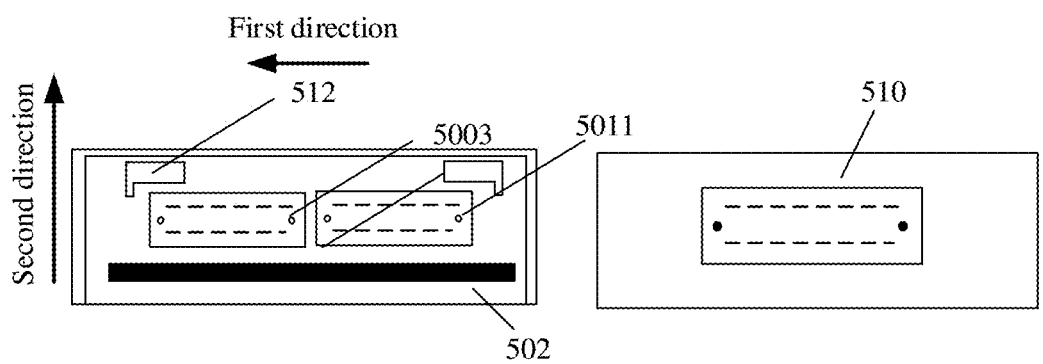
FIG. 5C is a side view of the light source module according to the embodiment shown in FIG. 5A.

FIG. 5A to FIG. 5C are schematic structural diagrams of a light source module according to an embodiment of this application. FIG. 5A is a front view of a light source module according to an embodiment of this application. FIG. 5B is a cross-sectional view of the light source module according to the embodiment in FIG. 5A, along a B-B direction (top view) shown in FIG. 5A. FIG. 5C is a side view (including a left view and a right view) of the light source module according to the embodiment in FIG. 5A.

In the embodiment shown in FIG. 5A to FIG. 5C, the light source module includes an optical signal transceiver connector 500, a light source connector 501, an electrical connector 502, a light source 503, a microcontroller 505, a memory 506, an optical connector adapter 510, and a housing 511.

As shown in FIG. 5A, the housing 511 has an internal accommodating cavity; and the optical signal transceiver connector 500 and the light source connector 501 are disposed at a first side of the housing 511 and protrude from the housing 511 along a third direction.

As shown in FIG. 5B, the optical signal transceiver connector 500 and the light source connector 501 may be disposed in parallel along a first direction. The electrical connector 502 is disposed at the first side of the housing 511 and protrudes from the housing 511 along the third direction. As shown in FIG. 5C, the electrical connector 502 may be stacked with the optical signal transceiver connector 500 or the light source connector 501 along a second direction.

It may be understood that the optical signal transceiver connector 500 and the light source connector 501 can also be arranged in other manners, for example, disposed in parallel with each other along the second direction, as long as the optical signal transceiver connector 500 and the light source connector 501 are disposed on the light source module. An arrangement manner of the optical signal transceiver connector 500 and the light source connector 501 is not particularly limited in this application.

As shown in FIG. 5B, the electrical connector 502, the optical signal transceiver connector 500, and the light source connector 501 may face a same direction. The light source 503 may include one or more lasers and is configured to output a single light beam or a plurality of light beams to the light source connector 501. The optical connector adapter 510 is disposed at a second side of the accommodating cavity in the housing 511, where the second side is one side opposite to the first side in the housing 511. The optical connector adapter 510 is connected to the optical signal transceiver connector 500 in the housing 511 through a fiber.

The light source module provided in this exemplary embodiment is integrated with an optical signal transmission device in the light source module, so that plug-and-play of the light source module is implemented while power consumption of the light source module is less than power consumption tolerable for heat dissipation.

The optical signal transceiver connector 500 may be crimped to or coupled with a single-mode fiber; and the light source connector 501 may be crimped to or coupled with a polarization-maintaining fiber.

Alternatively or additionally, a length of a projection of the electrical connector 502 on a projection plane formed by the second direction and the third direction may be set to be greater than a length of a projection of the optical signal transceiver connector 500 on the projection plane. In other words, a distance of the protrusion of the electrical connector 502 in the third direction is greater than a distance of the protrusion of the optical signal transceiver connector 500 in the third direction. For the third direction, refer to FIG. 5A. The third direction is a direction in which the light source module is inserted into the matching socket.

In this embodiment, because the distance of the protrusion of the electrical connector 502 in the third direction is greater than the distance of the protrusion of the optical signal transceiver connector 500 in the third direction, when the light source module is inserted into the matching socket, the electrical connector 502 comes in contact with a communication device earlier than the optical signal transceiver connector 500 and the light source connector 501. Therefore, the communication device can control a voltage within a safe range before the optical signal transceiver connector 500 and the light source connector 501 are completely inserted into the communication device, and safety is ensured when the optical signal transceiver connector 500 and the light source connector 501 are inserted.

The electrical connector 502 may be a "gold finger (Gold Finger)", and a specific pin type thereof includes, but is not limited to: communication connectors for power, a ground cable, a two-wire universal serial bus (Inter-Integrated Circuit, I2C), a light source reset control pin, a light source low power consumption control pin, and other types. The electrical connector 502 may be used to transmit a signal such as a light source in-operation signal, and a light source interruption or alarm signal.

In this embodiment, the electrical connector 502 is located at the first side of the accommodating cavity, protrudes from the housing 511, and is configured to supply power to the light source module. The electrical connector 502 is stacked with the optical signal transceiver connector 500 and/or the light source connector 501 along the second direction, and the first direction is perpendicular to the second direction.

Figure 6A:
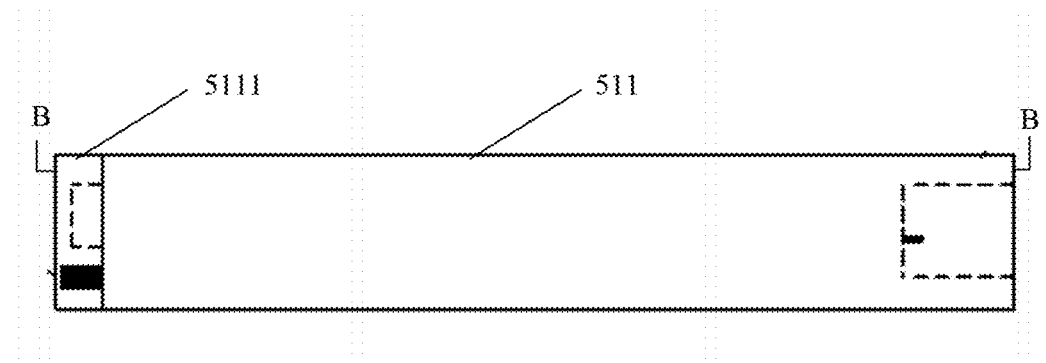
FIG. 6A is a front view of a light source module according to another embodiment of this application.

Additionally or alternatively, the housing 511 may extend along the third direction to form a protective cover to protect the optical signal transceiver connector 500 and the light source connector 501. For example, as shown in FIG. 6A, the protective cover may be an antiknock and dustproof cover 5111. The antiknock and dustproof cover 5111 may be configured to provide antiknock protection and dustproof protection for the protrusions of the optical signal transceiver connector 500 and the light source connector 501 that are located at the first side of the housing 511.

Alternatively or additionally, in the embodiment shown in FIG. 5C, the light source module may further include a positioning collar 512, which may be used for positioning to facilitate insertion when the light source module is inserted into the matching socket.

Alternatively or additionally, the optical signal transceiver connector 500 may include a positioning guide hole 5003. Alternatively or additionally, the light source connector 501 may include a positioning guide hole 5011. The positioning guide holes 5003 and 5011 are used for positioning to facilitate insertion when the light source module is inserted into the matching socket.

In a possible implementation, the light source 503 may emit a plurality of light beams or a single light beam. The plurality of light beams or the single light beam is transmitted to the light source connector 501, for example, through a polarization-maintaining fiber 5012, and further output to an optical engine of a switch. After the optical engine performs photoelectric modulation on the received light, the optical engine generates an optical signal, and transmits the generated optical signal to the optical signal transceiver connector 500 through a single-mode fiber. Further, the optical signal transceiver connector 500 transmits the received optical signal to the optical connector adapter 510 through a single-mode fiber 5001 disposed in the accommodating cavity in the housing 511. After receiving the optical signal, the optical connector adapter 510 may send the optical signal to a corresponding external device through a fiber.

Alternatively or additionally, the optical connector adapter 510 may receive an optical signal from an external device, and transmit the optical signal to the optical signal transceiver connector 500 through the single-mode fiber 5001 disposed in the housing 511, and the optical signal transceiver connector 500 transmits the optical signal to the optical engine of the switch through the single-mode fiber 5001. The optical engine may demodulate the received optical signal, and transmit an electrical signal obtained through demodulation to a switch chip for service processing.

Figure 6B:
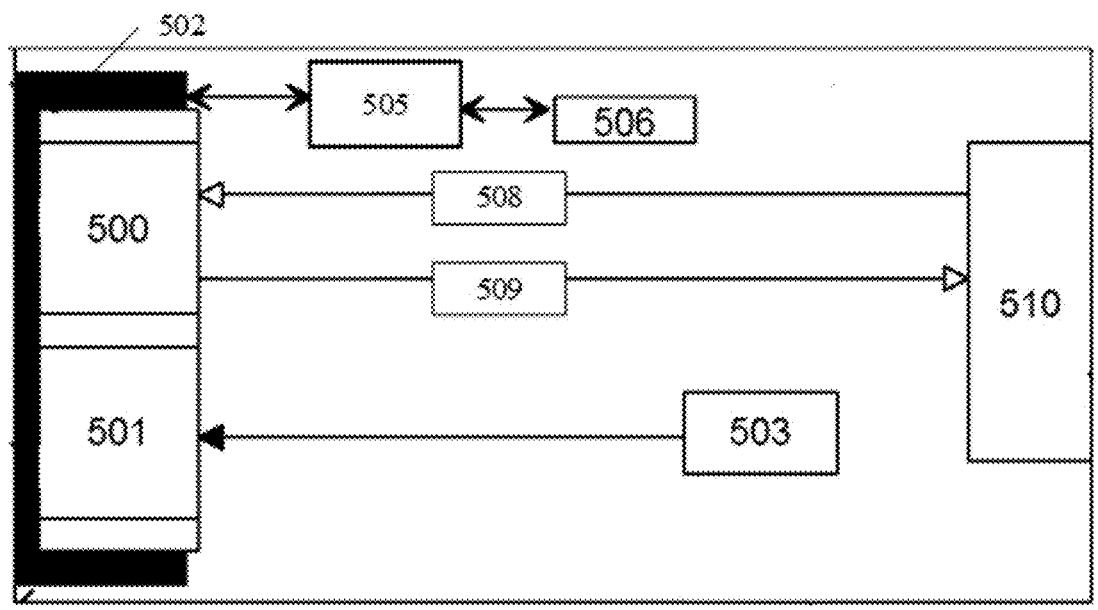
FIG. 6B is a cross-sectional view of the light source module according to the embodiment shown in FIG. 6A.
Figure 6C:
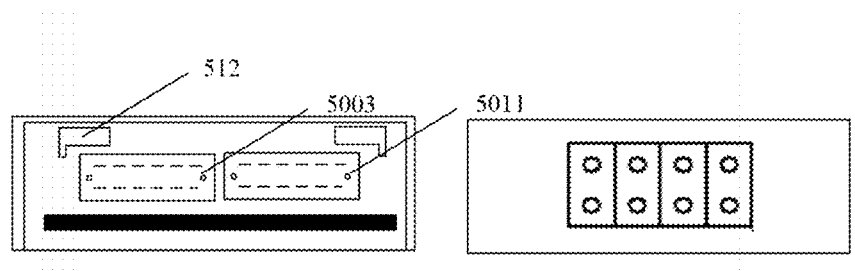
FIG. 6C is a side view of the light source module according to the embodiment shown in FIG. 6A.

FIG. 6A to FIG. 6C are schematic structural diagrams of a light source module according to another embodiment of this application. FIG. 6A is a front view of a light source module according to another embodiment of this application. FIG. 6B is a cross-sectional view of the light source module shown in FIG. 6A, along a B-B direction shown in FIG. 6A. FIG. 6C is a side view (including a left view and a right view) of the light source module shown in FIG. 6A.

Alternatively or additionally, as shown in FIG. 6A to FIG. 6C, the structures included in the light source module, such as an optical signal transceiver connector 500, a light source connector 501, an electrical connector 502, a light source 503, a microcontroller 505, a memory 506, an optical connector adapter 510, a housing 511, and the like, may refer to the light source module shown in FIG. 5A to FIG. 5C. Details are not described herein again.

Compared with the light source module provided in FIG. 5A to FIG. 5C, the light source module provided in FIG. 6A to FIG. 6C additionally further includes a demultiplexer 508 and a multiplexer 509. A function of the multiplexer 509 is to multiplex a plurality of optical signals with different wavelengths for transmission through one fiber. A function of the demultiplexer 508 is opposite to the function of the multiplexer 509 and is to demultiplex at least one optical signal transmitted in one fiber into more optical signals based on wavelengths.

The demultiplexer 508 may be disposed in the housing 511. The demultiplexer 508 is located between the optical connector adapter 510 and the optical signal transceiver connector 500, and configured to demultiplex at least one optical signal transmitted from the optical connector adapter 510 to the optical signal transceiver connector 500 into more optical signals based on wavelengths. The multiplexer 509 may also be disposed in the housing 511. The multiplexer 509 is located between the optical connector adapter 510 and the optical signal transceiver connector 500, and configured to multiplex a plurality of optical signals transmitted from the optical signal transceiver connector 500 to the optical connector adapter 510 into one optical signal.

Figure 6D:
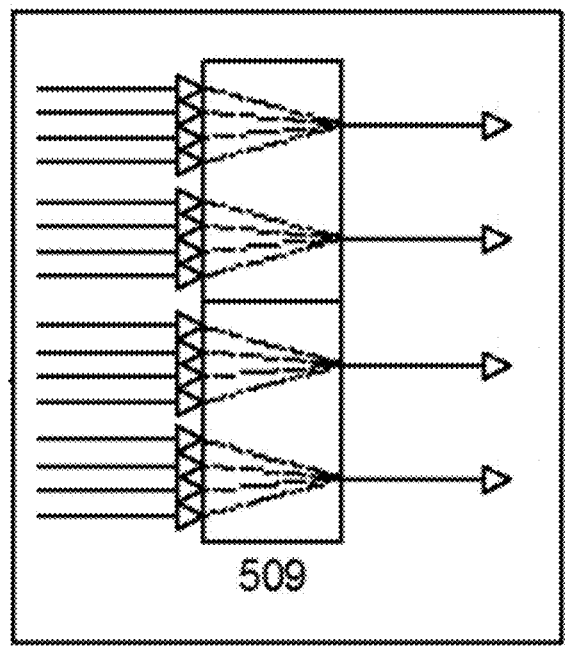
FIG. 6D is a schematic diagram of a process of multiplexing optical signals by a multiplexer according to the embodiment shown in FIG. 6A.

During specific implementation, in a possible case, when emitting light, the light source 503 may emit a plurality of light beams or a single light beam, and output the plurality of light beams or the single light beam to an optical engine of a switch through the light source connector 501. After the optical engine performs photoelectric modulation on the received light, the optical engine generates a plurality of optical signals, for example, 16 optical signals, and transmits the generated 16 optical signals to the optical signal transceiver connector 500 through a single-mode fiber. Further, the optical signal transceiver connector 500 transmits the 16 optical signals to the multiplexer 509, so that the multiplexer 509 multiplexes the optical signals. For example, the multiplexer 509 may multiplex the 16 optical signals into four optical signals, and transmit the four optical signals to the optical connector adapter 510. FIG. 6D is a schematic diagram of a process of multiplexing optical signals by the multiplexer according to an embodiment of this application.

Figure 6E:
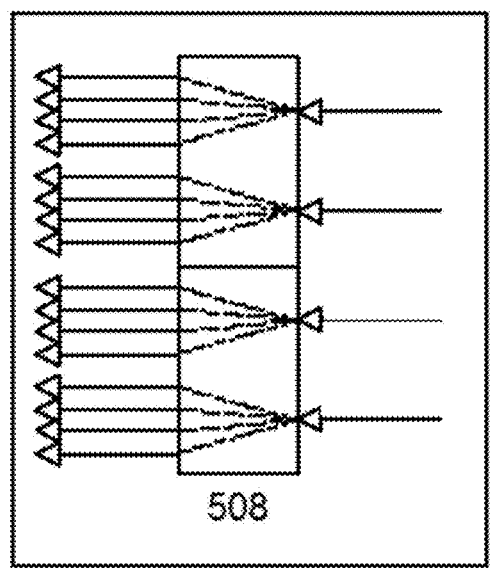
FIG. 6E is a schematic diagram of a process of demultiplexing an optical signal by a demultiplexer according to the embodiment shown in FIG. 6A.

Additionally, when the optical connector adapter 510 receives optical signals sent by an external device, the optical connector adapter 510 may transmit at least one optical signal received from the external device to the demultiplexer 508. For example, the optical signals received by the optical connector adapter 510 are four optical signals. The demultiplexer 508 may demultiplex the four optical signals based on wavelengths, for example, demultiplex the four optical signals into 16 optical signals. The demultiplexer 508 may transmit the 16 optical signals obtained through demultiplexing to the optical signal transceiver connector 500. Exemplarily, FIG. 6E is a schematic diagram of a process of demultiplexing an optical signal by the demultiplexer 508 according to an embodiment of this application.

Figure 7A:
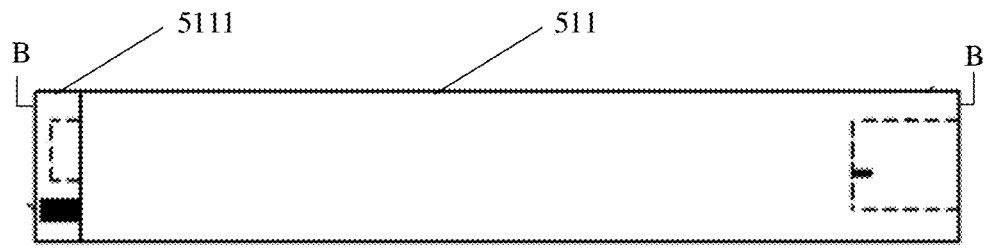
FIG. 7A is a front view of a light source module according to still another embodiment of this application.
Figure 7B:
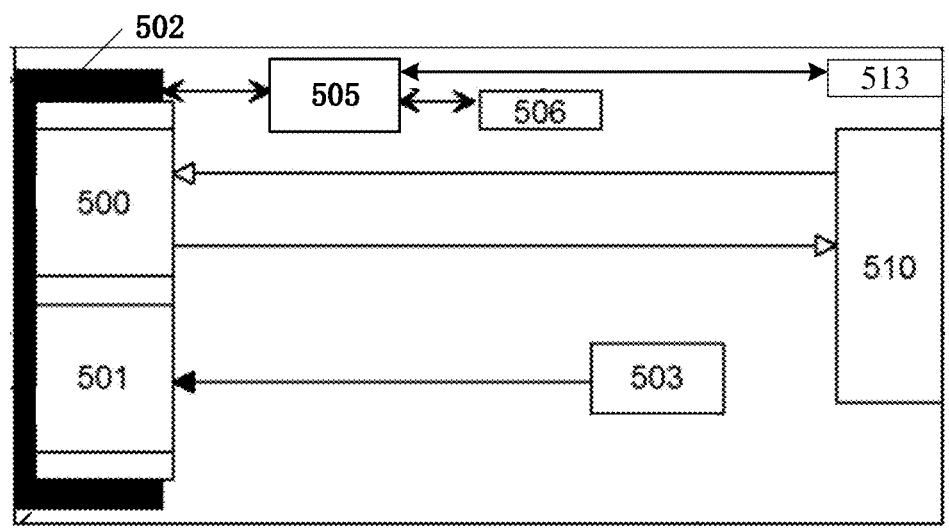
FIG. 7B is a cross-sectional view of the light source module according to the embodiment shown in FIG. 7A.
Figure 7C:
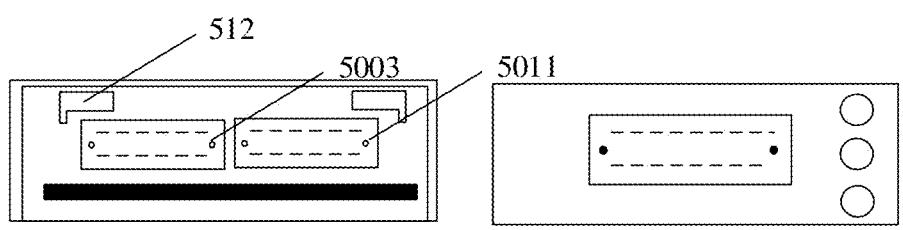
FIG. 7C is a side view of the light source module according to the embodiment shown in FIG. 7A.

FIG. 7A to FIG. 7C are schematic structural diagrams of a light source module according to still another embodiment of this application. FIG. 7A is a front view of a light source module according to still another embodiment of this application. FIG. 7B is a cross-sectional view of the light source module according to the embodiment shown in FIG. 7A, along a B-B direction shown in FIG. 7A. FIG. 7C is a side view (including a left view and a right view) of the light source module according to the embodiment shown in FIG. 7A.

As shown in FIG. 7A to FIG. 7C, the structures included in the light source module, such as an optical signal transceiver connector 500, a light source connector 501, an electrical connector 502, a light source 503, a microcontroller 505, a memory 506, an optical connector adapter 510, a housing 511, and the like, may refer to the embodiment shown in FIG. 5A to FIG. 5C. Details are not described herein again. Compared with the light source module provided in the foregoing exemplary embodiments, the light source module provided in the embodiment shown in FIG. 7A to FIG. 7C may additionally or alternatively further include an alarm apparatus, for example, an alarm indicator 513, or an alarm buzzer. For example, the alarm indicator 513 may be disposed at a second side of an accommodating cavity of the housing 511.

Additionally or alternatively, the alarm apparatus is controlled by the microcontroller 505, and may receive, from the electrical connector 502 of the light source module, matching information from a switch. The matching information is used to indicate whether the switch matches the light source module. The microcontroller 505 controls, based on the matching information, for example, a display mode of the alarm indicator 513 that can be observed from the outside at the side where the switch and the optical connector adapter 510 are located, or controls a buzzing mode of the alarm buzzer. Optionally, the microcontroller 505 may receive the matching information of the switch and the light source module through the electrical connector 502. Based on the matching information, whether the switch matches the light source module may be determined, and a lighting rule of the alarm indicator 513 may be adjusted based on a matching result of the switch and the light source module. For example, when the switch does not match the light source module, the alarm indicator 513 is controlled to be permanently on, to prompt operation and maintenance staff to replace the light source module.

It should be noted that a quantity of alarm indicators 513 included in the light source module is not limited in this embodiment of this application. FIG. 7C is described by using an example in which only three alarm indicators are included.

It should be noted that in this embodiment, as shown in FIG. 7C, the optical connector adapter 510 is a Multi Push On (MPO) connector.

Figure 8A:
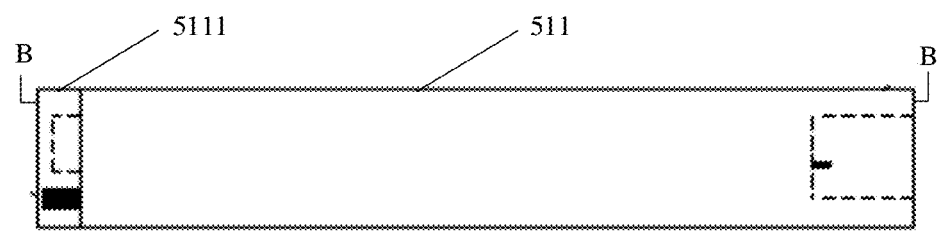
FIG. 8A is a front view of a light source module according to still another embodiment of this application.
Figure 8B:
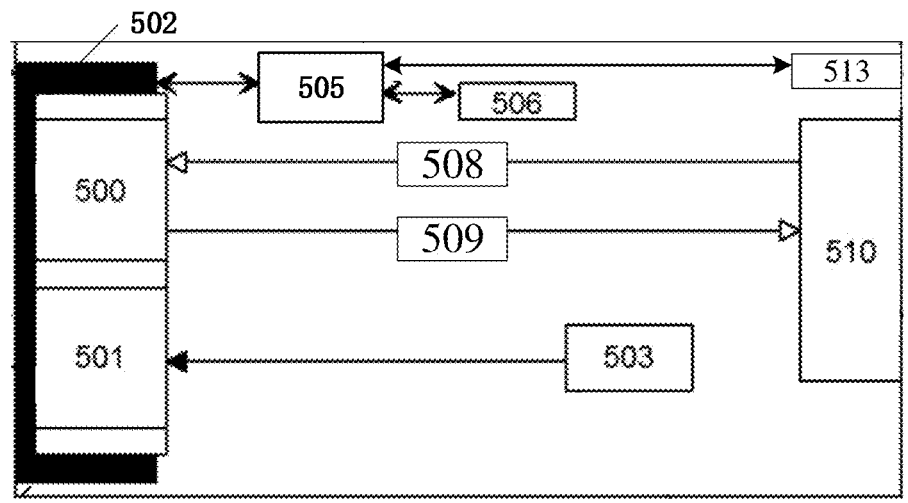
FIG. 8B is a cross-sectional view of the light source module according to the embodiment shown in FIG. 8A.
Figure 8C:
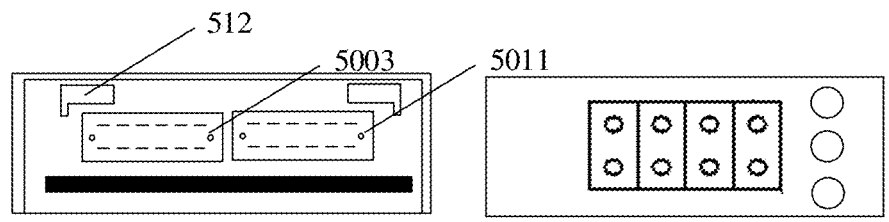
FIG. 8C is a side view of the light source module according to the embodiment shown in FIG. 8A.

FIG. 8A to FIG. 8C are schematic structural diagrams of a light source module according to still another embodiment of this application. FIG. 8A is a front view of a light source module according to still another embodiment of this application. FIG. 8B is a cross-sectional view of the light source module shown in FIG. 8A, along a B-B direction shown in FIG. 8A. FIG. 8C is a side view (including a left view and a right view) of the light source module according to the embodiment shown in FIG. 8A.

As shown in FIG. 8A to FIG. 8C, the structures included in the light source module, such as an optical signal transceiver connector 500, a light source connector 501, an electrical connector 502, a light source 503, a microcontroller 505, a memory 506, an optical connector adapter 510, a housing 511, and the like, may refer to the embodiment shown in FIG. 5A to FIG. 5C. Details are not described herein again. Compared with the light source module provided in the foregoing exemplary embodiments, referring to FIG. 8A to FIG. 8C, the light source module further includes an alarm indicator 513. The alarm indicator 513 is disposed at a second side of the housing 511, and controlled by the microcontroller 505. It should be noted that a quantity of alarm indicators included in the light source module is not limited in this application. FIG. 8C is described by using an example in which only three alarm indicators are included.

A difference between the embodiment shown in FIG. 8A to FIG. 8C and the embodiment shown in FIG. 7A to FIG. 7C lies in that the optical connector adapter 510 uses an SN® connector from SENKO Co., Ltd.

In another embodiment, alternatively, a plurality of light source connectors 501 may be disposed to enhance power of light. For example, a plurality of light sources may be disposed in the accommodating cavity, and each light source is separately connected to one of the plurality of light source connectors 501.

Light is emitted by using the plurality of light sources and light source connectors. In this way, a quantity of optical channels of the light source module can be increased. With the same quantity of optical channels required, a requirement for density of optical connection ports of a switch can also be lowered.

Figure 9A:
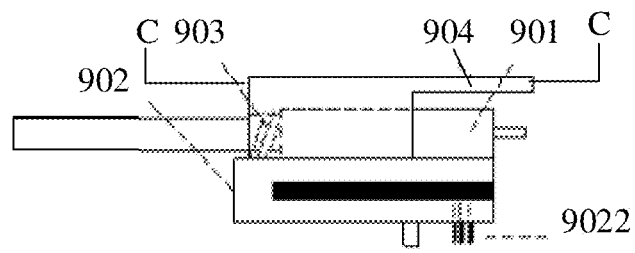
FIG. 9A is a front view of a matching socket according to an embodiment of this application.
Figure 9B:
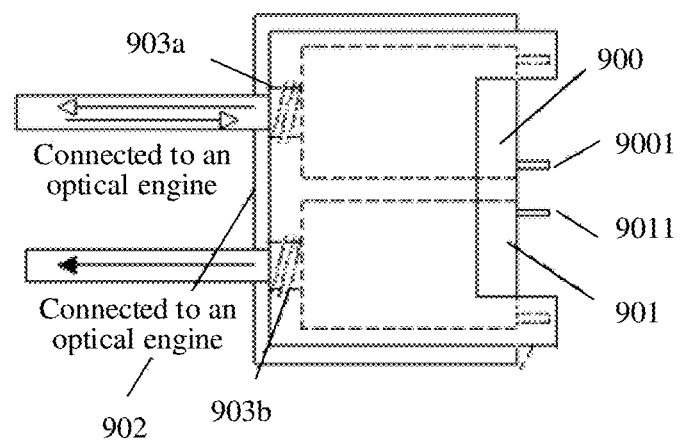
FIG. 9B is a cross-sectional view of the matching socket according to the embodiment shown in FIG. 9A.
Figure 9C:
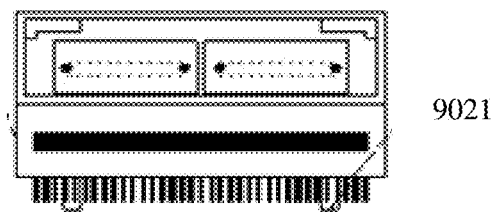
FIG. 9C is a side view of the matching socket according to the embodiment shown in FIG. 9A.

This application further provides a matching socket for a light source module. FIG. 9A to FIG. 9C exemplarily show a matching socket according to an embodiment of this application. FIG. 9A is a front view of a matching socket according to this application. FIG. 9B is a cross-sectional view of the matching socket shown in FIG. 9A, along a C-C direction shown in FIG. 9A. FIG. 9C is a side view (right view) of the matching socket shown in FIG. 9A.

The matching socket provided in this application includes an optical signal transceiver interface 900, a light source interface 901, an electrical connector 902, and an electrical interface located in the electrical connector 902.

Additionally or alternatively, the optical signal transceiver interface 900 may include two positioning guide pins 9001, and the light source interface 901 may also include two positioning guide pins 9011. The optical signal transceiver interface 900 corresponds to an optical signal transceiver connector 500 of the light source module. A single-mode fiber is coupled or crimped to the optical signal transceiver interface 900. The light source interface 901 corresponds to a light source connector 501 of the light source module. A polarization-maintaining fiber is coupled or crimped to the light source interface 901.

Additionally or alternatively, the matching socket may further include two springs 903 and a positioning pin 904. The positioning pin 904 is stacked with the optical signal transceiver interface 900 and/or the light source interface 901 along a second direction. The optical signal transceiver interface 900 and the light source interface 901 are located between the positioning pin 904 and the electrical connector 902 in the second direction, and the positioning pin 904 is connected to the electrical connector 902. One end of a first spring 903a of the two springs 903 is connected to the positioning pin 904, the other end of the first spring 903a is connected to the optical signal transceiver interface 900, one end of a second spring 903b of the two springs 903 is connected to the positioning pin 904, and the other end of the second spring 903b is connected to the light source interface 901. Because the positioning pin 904 is a fixed structure in the matching socket, the first spring 903a can provide elastic force for the optical signal transceiver interface 900, to enhance a connection between the optical signal transceiver interface 900 and the optical signal transceiver connector 500 of the light source module after insertion. The second spring 903b can provide elastic force for the light source interface 901, to enhance a connection between the light source interface 901 and the light source connector 501 of the light source module.

Figure 9D:
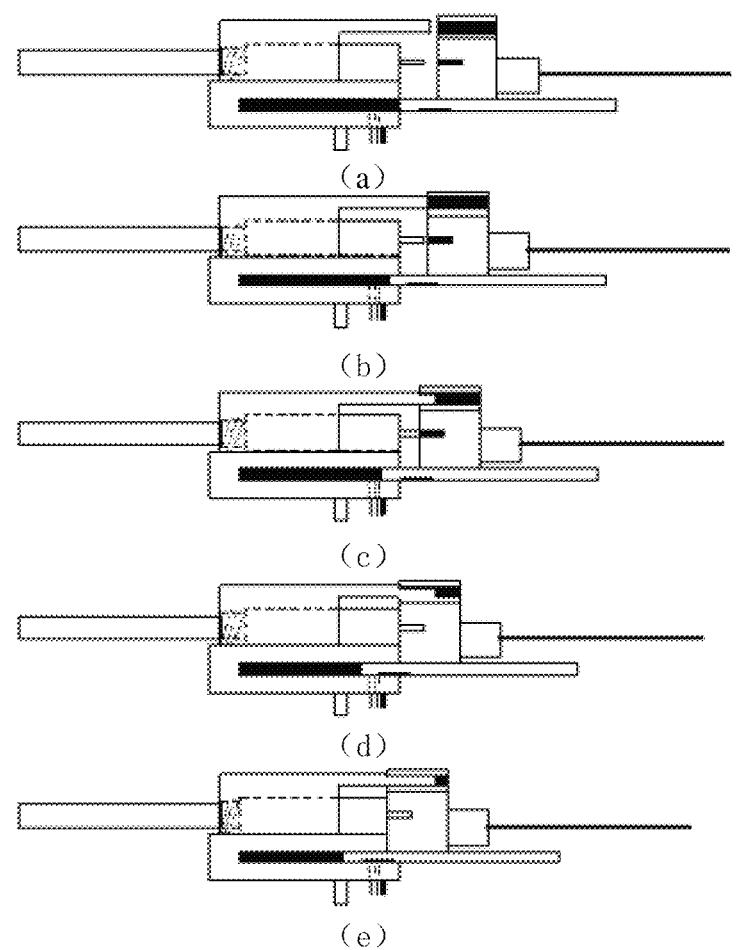
FIG. 9D is a schematic diagram of a process of inserting a light source module into the matching socket according to the embodiment shown in FIG. 9A.

To facilitate understanding of an insertion process, FIG. 9D shows a process of inserting the light source module into the matching socket. Referring to (a) in FIG. 9D, during insertion, primary positioning may be first performed based on an electrical connector 502 of the light source module and the electrical interface in the electrical connector 902 of the matching socket. Referring to (b) in FIG. 9D, secondary positioning may be performed based on a positioning collar 512 of the light source module and the positioning pin 904 of the matching socket. Referring to (c) in FIG. 9D, final positioning may be performed based on a positioning guide hole 5011 of the light source module and the positioning guide pin 9011 of the matching socket, and based on a positioning guide hole 5003 of the light source module and the positioning guide pin 9001 of the matching socket. Refer to (d) in FIG. 9D. (d) in FIG. 9D shows the light source module inserted into the matching socket based on positioning. Referring to (e) in FIG. 9D, the light source module may be further pushed upon completion of insertion, so that the spring 903 in the matching socket is compressed.

Figure 9E:
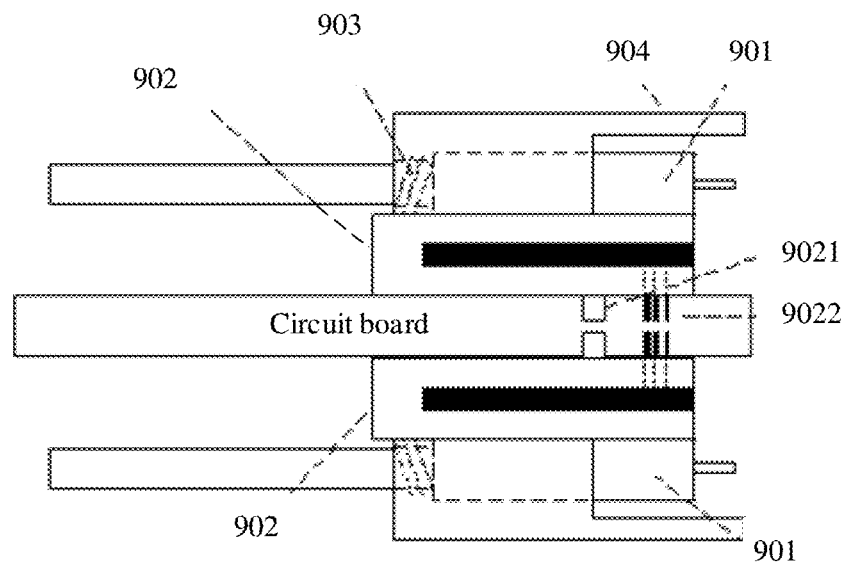
FIG. 9E is a front view of the matching socket crimped to a circuit board of a switch according to the embodiment shown in FIG. 9A.
Figure 9F:
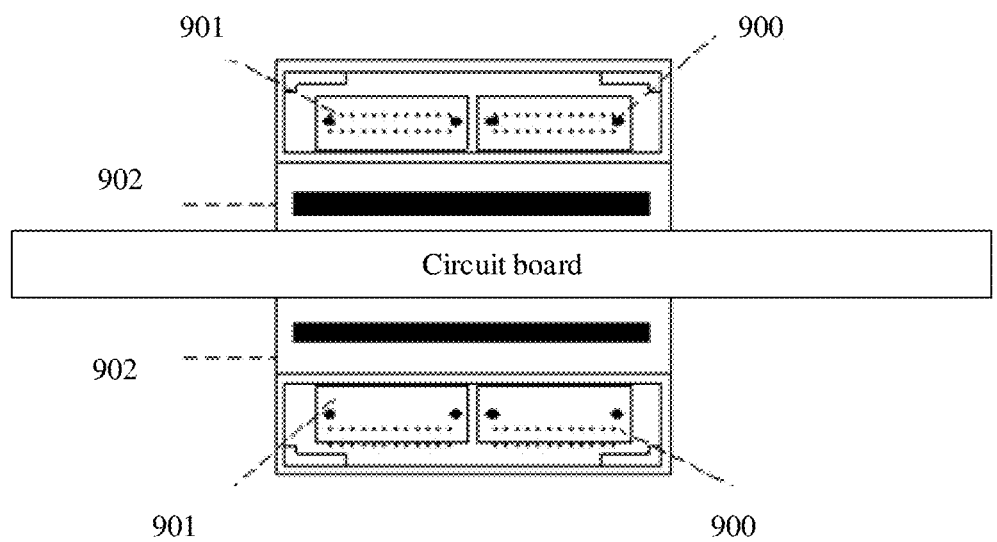
FIG. 9F is a side view of the matching socket crimped to a circuit board of a switch according to the embodiment shown in FIG. 9A.

Referring to FIG. 9A or FIG. 9C, additionally or alternatively, the bottom of the electrical connector 902 further includes a crimping positioning pin 9021, used for positioning when the matching socket is crimped to a circuit board of a switch. The bottom of the electrical connector 902 further includes a crimping pin 9022 configured to crimp the matching socket to the circuit board of the switch. To facilitate understanding, FIG. 9E exemplarily shows a front view of the matching socket crimped to the circuit board of the switch. FIG. 9F exemplarily shows a side view of the matching socket crimped to the circuit board of the switch.

Figure 10A:
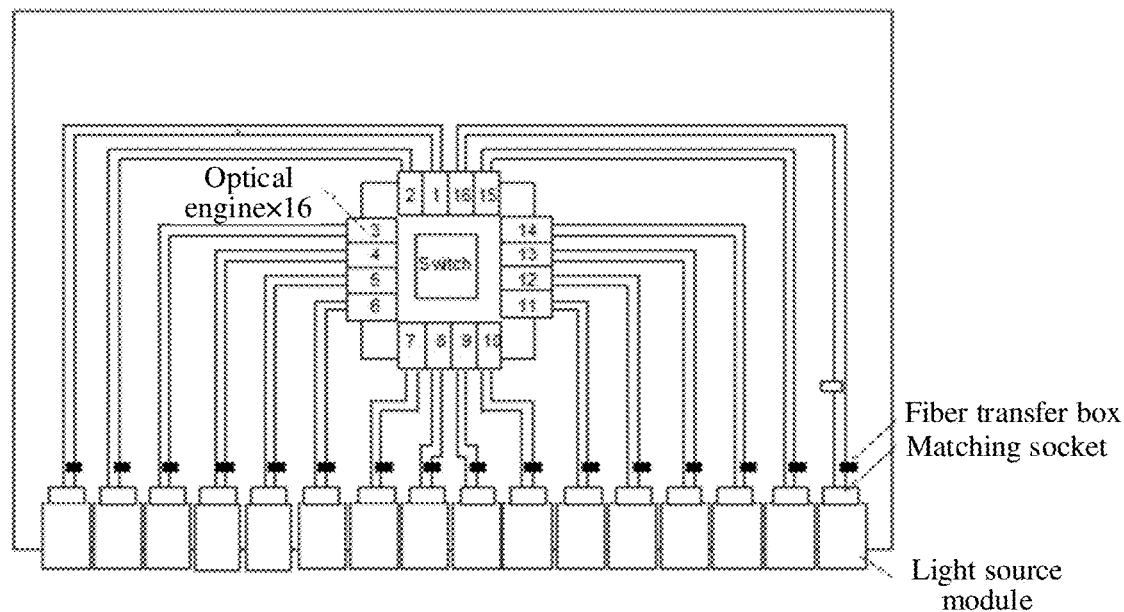
FIG. 10A is a top view of a switch system according to an embodiment of this application.
Figure 10B:
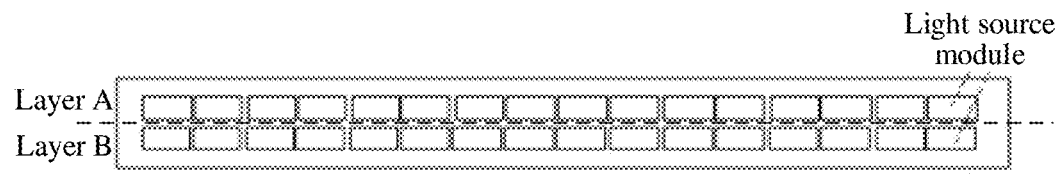
FIG. 10B is a front view of the switch system according to the embodiment shown in FIG. 10A.
Figure 10C:
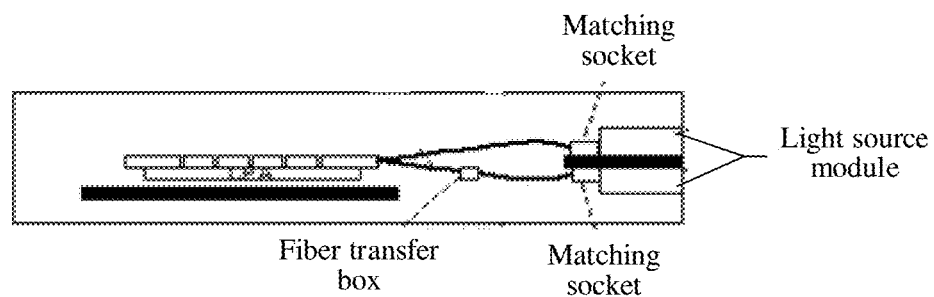
FIG. 10C is a side view of the switch system according to the embodiment shown in FIG. 10A.

The following describes a system after a light source module is inserted into a matching socket and the matching socket is crimped to a switch. FIG. 10A to FIG. 10C are schematic diagrams of a switch system according to an embodiment of this application. FIG. 10A is a top view of the system. FIG. 10B is a front view of the system. FIG. 10C is a side view of the system. The system provided in this application includes a switch chip, an optical engine, a fiber, a fiber transfer box, a matching socket, and a light source module. The fiber transfer box is also referred to as a fiber terminal box. One end of the fiber transfer box may be connected to an optical cable, and the other end of the fiber transfer box may be connected to a pigtail. The fiber transfer box may be configured to split one optical cable into a plurality of fibers, and provide welding between fibers or welding between a fiber and a pigtail. It should be noted that FIG. 10A to FIG. 10C are only an example. Quantities of optical engines, fibers, matching sockets, and light source modules included in the system are not specifically limited in this application. FIG. 10A to FIG. 10C exemplarily show 32 light source modules in total at two layers A and B and corresponding matching sockets.

Figure 11:
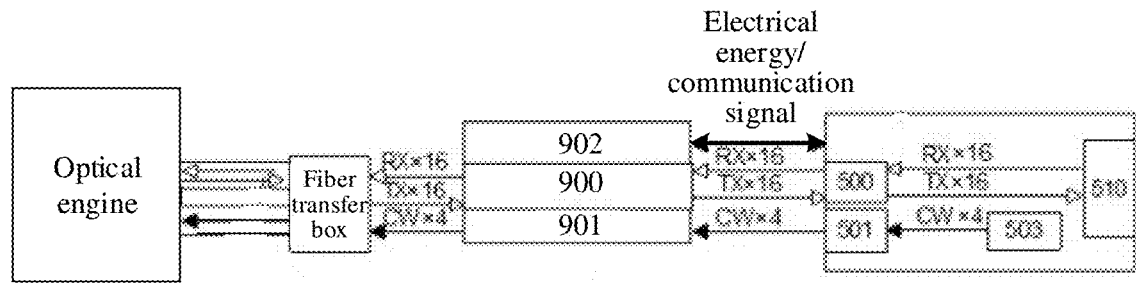
FIG. 11 is a schematic diagram of an optical signal transmission process according to an embodiment of this application.

FIG. 10A to FIG. 10C are schematic diagrams of the system. The following describes in detail an optical signal transmission process with reference to the system illustrated in FIG. 10A to FIG. 10C. FIG. 11 exemplarily shows the optical signal transmission process.

An optical signal sending process shown in FIG. 11 is as follows.

A light source 503 outputs light (for example, four light beams, represented by CW×4). CW×4 is transmitted by using a light source connector 501, a light source interface 901 of a matching socket, and a pigtail, and then transmitted to an optical engine after a fiber transfer box adjusts a line order.

Additionally or alternatively, before performing photoelectric modulation on CW×4, the optical engine may first determine whether a type of a modulator is matched. For example, if the modulator is a 4-channel modulator, modulation may be directly performed on CW×4; or if the modulator is a 16-channel modulator, CW×4 is split first, and then photoelectric modulation is performed.

Specifically, when the optical engine performs photoelectric modulation, an optical transceiver chip in the optical engine may split CW×4, and then input CW×4 to the modulator for modulation. Optical signals output after the modulation (for example, 16 optical signals output by the 16-channel modulator are represented by TX×16) are returned through a fiber to the fiber transfer box for adjusting the line order, and then interconnected to an optical signal transceiver interface 900 of the matching socket, and then to an optical signal transceiver connector 500 of a light source module. Finally, the optical signal transceiver connector 500 may transmit TX×16 to an optical connector adapter 510, and the optical connector adapter 510 sends TX×16 to an external device.

An optical signal receiving process shown in FIG. 11 is as follows.

The optical connector adapter 510 receives optical signals from the external device (for example, when the received optical signals are 16 optical signals, the optical signals are represented by RX×16), the optical connector adapter 510 transmits RX×16 to the optical signal transceiver connector 500 through a fiber in the light source module. RX×16 is transmitted, through the optical signal transceiver interface 900 of the matching socket and a pigtail interconnected to the optical signal transceiver interface 900, to the fiber transfer box for adjusting a line order, and finally transmitted to the optical engine.

Optionally, not illustrated in FIG. 11, the system may further include a switch line card configured to provide electrical energy for the optical engine.

The light source module and the matching socket described in the foregoing exemplary embodiments may satisfy a switch with a 400 Gbit/s transmission rate. To support a higher transmission rate, this application further provides a light source module on which an optical splitter may be disposed to increase an optical signal transmission rate.

Figure 12A:
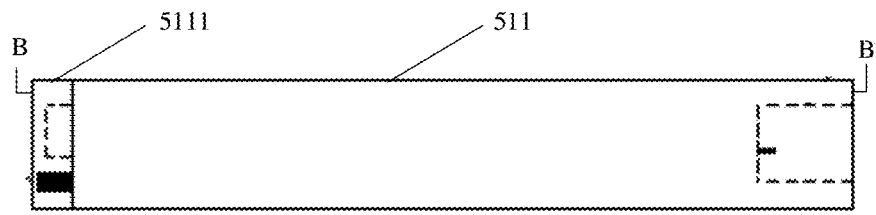
FIG. 12A is a front view of a light source module according to still another embodiment of this application.
Figure 12B:
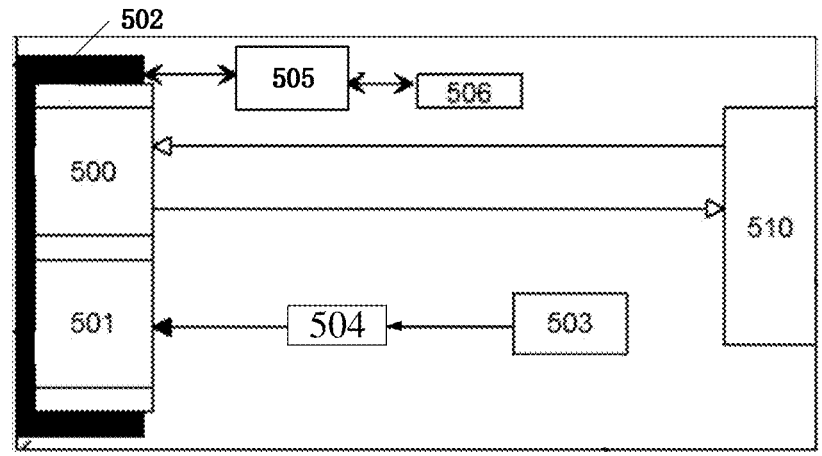
FIG. 12B is a cross-sectional view of the light source module according to the embodiment shown in FIG. 12A.
Figure 12C:
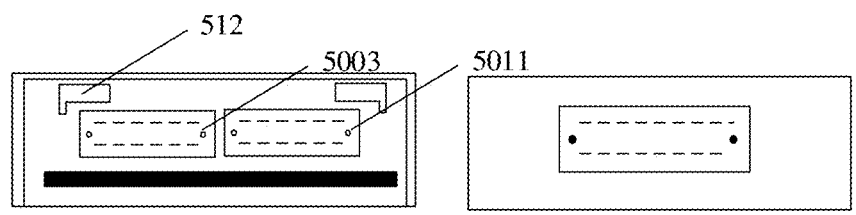
FIG. 12C is a side view of the light source module according to the embodiment shown in FIG. 12A.

FIG. 12A to FIG. 12C are schematic structural diagrams of a light source module according to still another embodiment of this application. FIG. 12A is a front view of the light source module according to this embodiment. FIG. 12B is a cross-sectional view of the light source module according to the embodiment shown in FIG. 12A, along a B-B direction shown in FIG. 12A. FIG. 12C is a side view (including a left view and a right view) of the light source module according to the embodiment shown in FIG. 12A.

Optionally, as shown in FIG. 12A to FIG. 12C, the structures included in the light source module, such as an optical signal transceiver connector 500, a light source connector 501, an electrical connector 502, a light source 503, a microcontroller 505, a memory 506, an optical connector adapter 510, a housing 511, and the like, may refer to the foregoing exemplary embodiments. Details are not described herein again. Compared with the light source module provided in the foregoing exemplary embodiments, referring to FIG. 12A to FIG. 12C, the light source module further includes an optical splitter 504. The optical splitter 504 is disposed between the light source 503 and the light source connector 501, and configured to split light emitted by the light source 503 and transmit, to the light source connector 501, a plurality of light beams obtained after the splitting.

During specific implementation, power of the light source may be adjusted based on a split ratio of the optical splitter, so that power obtained after the splitting can still meet an optical power requirement.

Figure 13A:
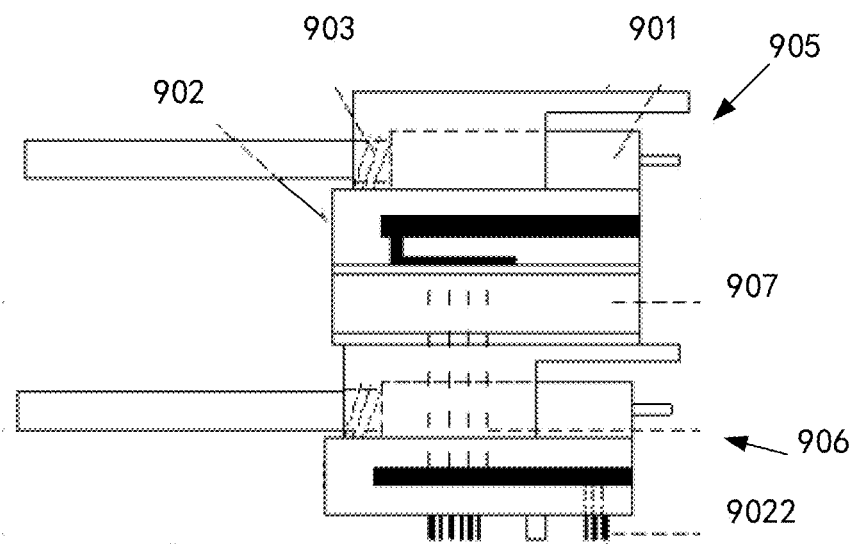
FIG. 13A is a front view of a matching socket according to an embodiment of this application, where the matching socket is crimped to a circuit board of a switch.
Figure 13B:
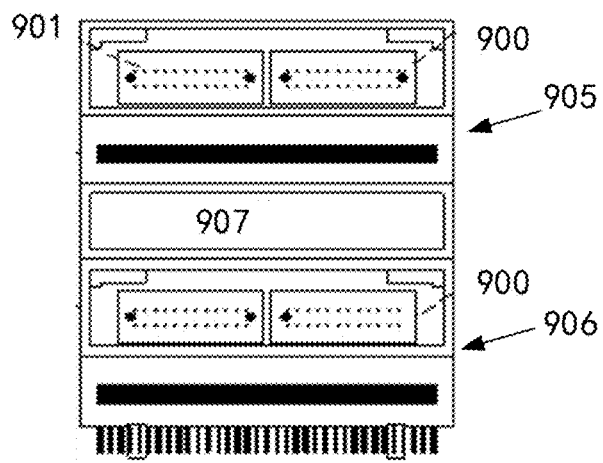
FIG. 13B is a side view of the matching socket crimped to the circuit board of the switch according to the embodiment shown in FIG. 13A.

Additionally or alternatively, an exemplary embodiment of this application further proposes that an air passage should be added between two layers of matching sockets crimped to a circuit board of a switch, to enhance a heat dissipation capability of a light source module. For example, FIG. 13A shows a front view of a matching socket crimped to the circuit board of the switch after the air passage is added. FIG. 13B exemplarily shows a side view of the matching socket crimped to the circuit board of the switch after the air passage is added.

Specifically, as shown in FIG. 13A and FIG. 13B, two layers of matching sockets are provided. An air passage 907 is disposed between an upper-layer matching socket 905 and a lower-layer matching socket 906, where the air passage 907 is configured to perform heat dissipation between the upper-layer matching socket 905 and the lower-layer matching socket 906. Additionally, the air passage 907 may further accommodate a heat dissipation component of the lower-layer matching socket 906, to improve heat dissipation performance when the light source module is inserted into the lower-layer matching socket 906.

Figure 14A:
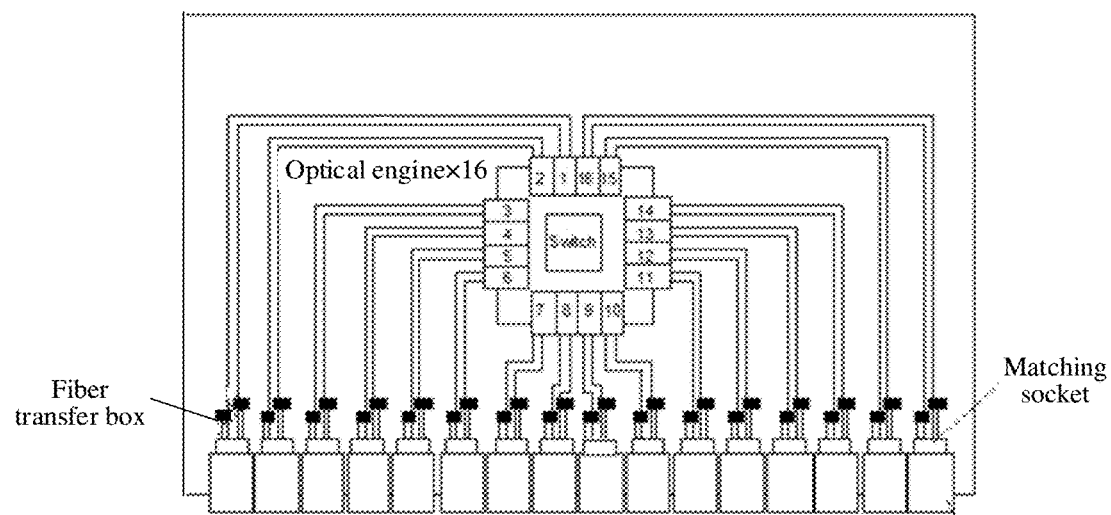
FIG. 14A is a front view of a light source module according to still another embodiment of this application.
Figure 14B:
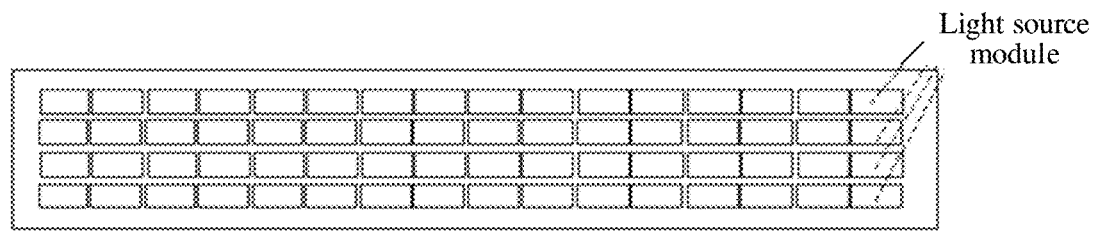
FIG. 14B is a cross-sectional view of the light source module according to the embodiment shown in FIG. 14A.
Figure 14C:
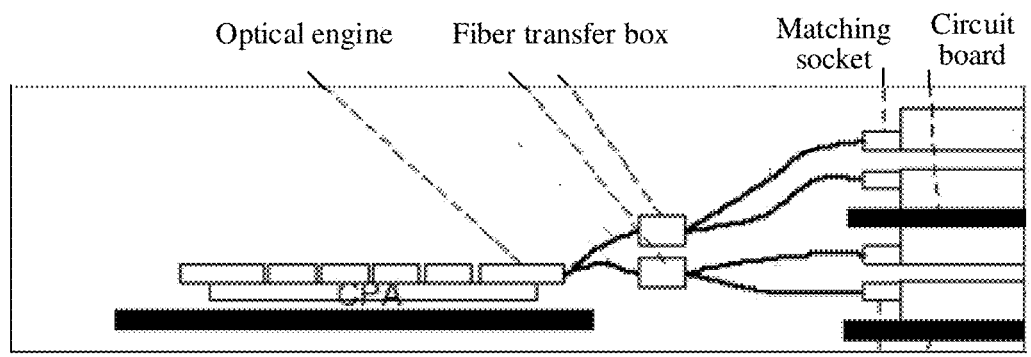
FIG. 14C is a side view of the light source module according to the embodiment shown in FIG. 14A.

For example, the following describes a switch system constructed based on the light source module provided in FIG. 12A to FIG. 12C. Referring to FIG. 14A to FIG. 14C, an exemplary embodiment of this application provides a schematic diagram of a system. FIG. 14A is a top view of the system. FIG. 14B is a front view of the system. FIG. 14C is a side view of the system. The system provided in this embodiment includes a switch chip, an optical engine, a fiber, a fiber transfer box, a matching socket, and a light source module. It should be noted that FIG. 14A to FIG. 14C are only an example. Quantities of optical engines, fibers, matching sockets, and light source modules included in the system are not specifically limited in this application. FIG. 14A to FIG. 14C exemplarily show 64 light source modules in total at four layers and corresponding matching sockets.

This application further proposes a manner of using a pluggable light source module provided in this application and a conventional pluggable optical module or a linear pluggable optical module in a conventional technology in combination.

Figure 15A:
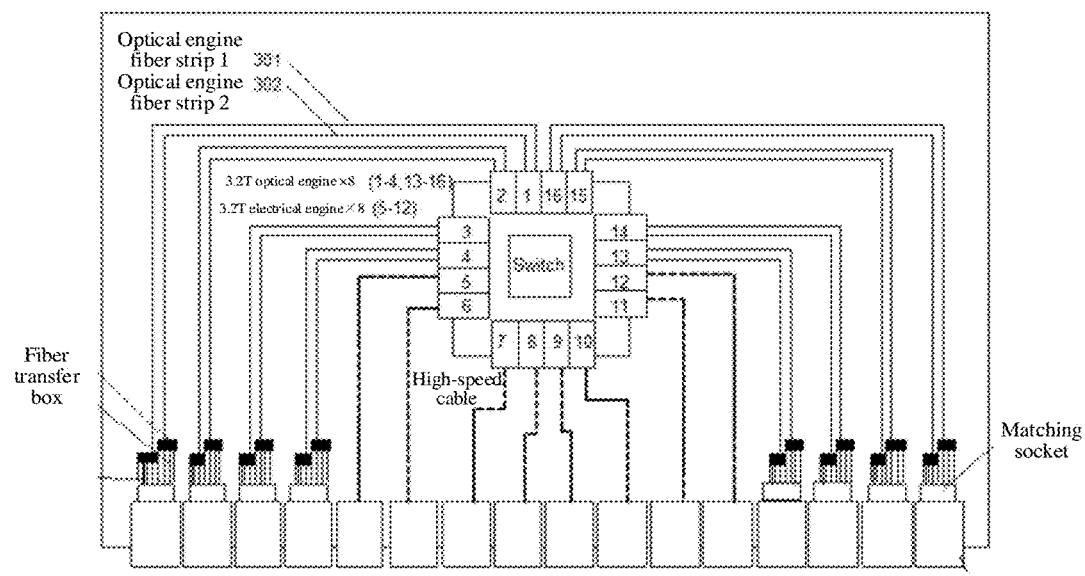
FIG. 15A is a front view of a light source module according to still another embodiment of this application.
Figure 15B:
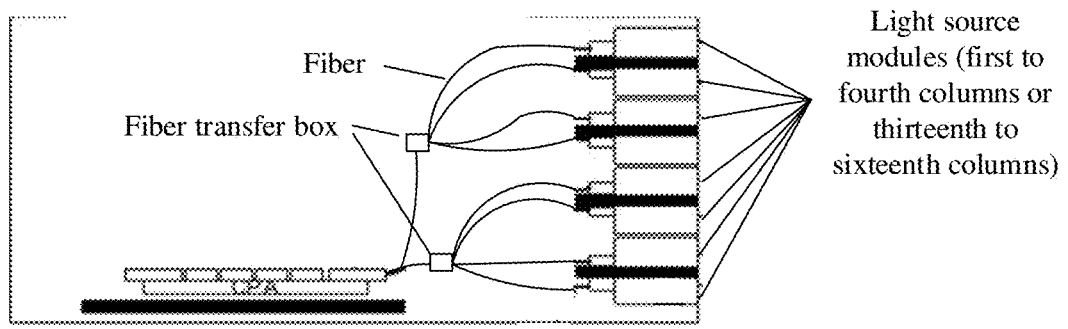
FIG. 15B is a cross-sectional view of the light source module according to the embodiment shown in FIG. 15A.
Figure 15C:
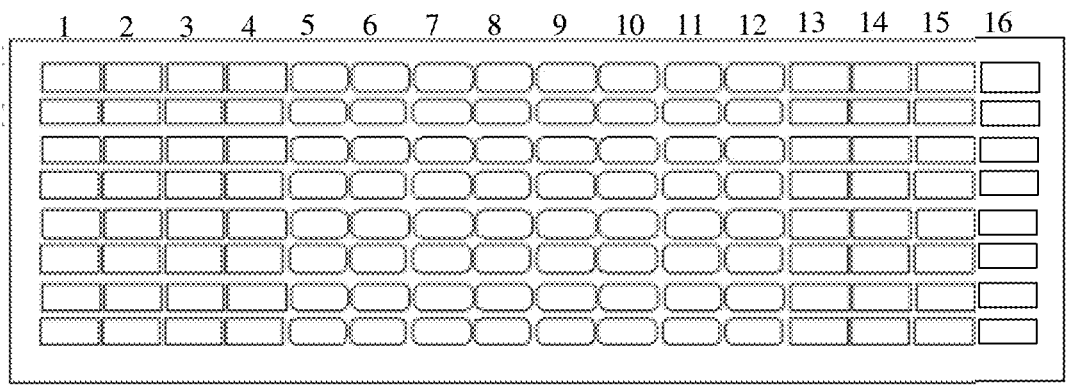
FIG. 15C is a side view of the light source module according to the embodiment shown in FIG. 15A.
Figure 15C:
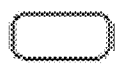
Figure 15C:

Referring to FIG. 15A to FIG. 15C, if there are 128 light source modules in total, 64 light source modules provided in this application and 64 conventional pluggable optical modules (or linear pluggable optical modules) may be used. FIG. 15A is a top view of a system. FIG. 15B is a front view of the system. FIG. 15C is a side view of the system. It should be noted that the pluggable light source module provided in this application and included in the system may be the light source module provided in any one of the foregoing embodiments.

Specifically, referring to FIG. 15C, the pluggable light source modules provided in this embodiment of this application are used in the fifth to the twelfth columns. Refer to FIG. 15B in combination with FIG. 15C, FIG. 15B is a schematic connection diagram of a connection between any one of the first to the fourth columns and the thirteenth to the sixteenth columns that use the light source modules provided in this application and a communication device. In this embodiment, eight light source modules in each column are classified into two groups, and each group includes four light source modules. Each group of light source modules is connected, through a fiber, to a fiber transfer box for adjusting a line order. Two fiber transfer boxes are both connected to an optical engine of a switch.

The foregoing descriptions are merely specific implementations of this application and not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A light source module, comprising:
   a housing, with an accommodating cavity disposed in the housing;
   a light source, located in the accommodating cavity, and configured to emit light;
   a light source connector, located at a first side of the accommodating cavity, protruding from the housing, and configured to receive the light emitted by the light source and output the light to a communication device external to the housing, wherein the light is used by the communication device to perform photoelectric modulation to generate a second optical signal;
   an optical signal transceiver connector, located at the first side of the accommodating cavity, protruding from the housing, and configured to receive the second optical signal from the communication device external to the housing; and
   an optical connector adapter, located at a second side of the accommodating cavity, and configured to receive the second optical signal from the optical signal transceiver connector,
   wherein the second side is a side opposite to the first side of the accommodating cavity.
2. The light source module according to claim 1, wherein the light source module further comprises:
   a polarization-maintaining fiber, wherein one end of the polarization-maintaining fiber is connected to the light source, and the other end of the polarization-maintaining fiber is connected to the light source connector; and
   a single-polarization fiber, wherein one end of the single-polarization fiber is connected to the optical connector adapter, and the other end of the single-polarization fiber is connected to the optical signal transceiver connector.
3. The light source module according to claim 1, wherein the optical signal transceiver connector and the light source connector are disposed in parallel along a first direction at the first side, and the first direction is perpendicular to an insertion direction of the light source module.
4. The light source module according to claim 1, further comprising:
   an optical splitter located between the light source and the light source connector, and configured to split the light emitted by the light source to obtain a plurality of light beams.
5. The light source module according to claim 1, further comprising:

a demultiplexer located between the optical connector adapter and the optical signal transceiver connector, and configured to demultiplex at least one optical signal output by the optical connector adapter and send a plurality of demultiplexed optical signals to the optical signal transceiver connector.

6. The light source module according to claim 1, further comprising:
a multiplexer located between the optical connector adapter and the optical signal transceiver connector, and configured to multiplex a plurality of optical signals output by the optical signal transceiver connector and send at least one multiplexed optical signal to the optical connector adapter.

7. The light source module according to claim 1, wherein the light source module further comprises:
an electrical connector, located at the first side of the accommodating cavity, protruding from the housing, and configured to supply power to the light source module,
wherein the electrical connector is stacked with the optical signal transceiver connector and/or the light source connector along a second direction, and the first direction is perpendicular to the second direction.

8. The light source module according to claim 7, wherein a length of a projection of the electrical connector on a projection plane formed by the second direction and the third direction is greater than a length of a projection of the optical signal transceiver connector or the light source connector on the projection plane, and the third direction is perpendicular to the first direction and the second direction respectively.

9. The light source module according to claim 1, wherein the light source module further comprises:
a positioning collar, located at the first side, and configured to position the light source module during insertion of the light source module.

10. The light source module according to claim 1, wherein the light source connector and/or the optical signal transceiver connector further comprise/comprises:
a positioning guide hole, configured to position the light source connector and/or the optical signal transceiver connector during insertion of the light source module.

11. The light source module according to claim 1, further comprising:
a microcontroller located in the accommodating cavity, connected to the electrical connector, and configured to receive matching information from the communication device through the electrical connector; and
an alarm indicator located at the second side, connected to the microcontroller, and configured to indicate a matching status of the inserted light source module with the communication device,
wherein the microcontroller determines a matching result between the communication device and the light source module based on the matching information, and controls a lighting mode of the alarm indicator based on the matching result.

12. The light source module according to claim 1, wherein the optical connector adapter is an MPO connector or an SN connector.

13. The light source module according to claim 1, further comprising:
a protective cover located at the first side and protruding from the housing to protect the optical signal transceiver connector and the light source connector.

14. A matching socket for a light source module, connected to the light source module according to claim 1, wherein the matching socket comprises:
an optical signal transceiver interface, located at a side that is of the matching socket and that is used for inserting the light source module, and configured to perform optical signal transmission from an optical engine of the communication device external to the housing to the optical signal transceiver connector of the light source module, wherein the optical engine is configured to perform photoelectric modulation to generate the second optical signal; and
a light source interface, located at the side that is of the matching socket and that is used for inserting the light source module, and configured to transmit received light from the light source connector of the light source module to the optical engine.

15. The matching socket according to claim 14, wherein the optical signal transceiver interface is configured to be crimped to or be coupled with a single-mode fiber, and the light source interface is configured to be crimped to or coupled with a polarization-maintaining fiber.

16. The matching socket according to claim 14, wherein the matching socket further comprises:
an electrical connector, located at a side and configured to supply power to the matching socket based on electrical energy provided by a circuit board; and
a positioning pin, configured as stacked with the optical signal transceiver interface and/or the light source interface along a second direction perpendicular to the first direction, wherein one end of the positioning pin is connected to the electrical connector,
wherein the optical signal transceiver interface and the light source interface are located between the positioning pin and the electrical connector.

17. The matching socket according to claim 16, wherein the matching socket further comprises:
a first spring, wherein one end of the first spring is connected to the positioning pin, and the other end of the first spring is connected to the optical signal transceiver interface; and
a second spring, wherein one end of the second spring is connected to the positioning pin, and the other end of the second spring is connected to the light source interface.

18. An optical signal transmission method, applied to the light source module according to claim 1, wherein the method comprises:
emitting, by the light source of the light source module, light to the light source connector;
outputting, by the light source connector of the light source module to a communication device, the light emitted by the light source, wherein the second optical signal is generated after photoelectric modulation is performed on the light in the communication device;
receiving, by the optical signal transceiver connector of the light source module, the second optical signal, and sending the second optical signal to the optical connector adapter; and
sending, by the optical connector adapter, the second optical signal.

19. The method according to claim 18, wherein before the sending the second optical signal, the method further comprises:
receiving, by the optical signal transceiver connector, at least two fourth optical signals returned by the communication device; and multiplexing, by the multiplexer of the light source module, the at least two fourth optical signals to obtain the second optical signal.

20. The method according to claim 18, wherein before the outputting, by the light source connector of the light source module, the light emitted by the light source, the method further comprises:
    splitting, by the optical splitter of the light source module, the light emitted by the light source to obtain a plurality of light beams; and
    outputting, by the light source connector, the plurality of light beams.

21. The light source module according to claim 1, wherein the optical connector adapter is configured to connect to the optical signal transceiver connector in the housing through a fiber, and perform optical signal transmission with an external device.

22. The light source module according to claim 1, wherein
    the light source connector is configured to transmit the light to an optical engine of the communication device, wherein the communication device is a switch;
    the optical signal transceiver connector is configured to transmit the second optical signal to the optical connector adapter; and
    the optical connector adapter is configured to transmit the second optical signal to a corresponding external device.

23. The light source module according to claim 1, wherein the optical connector adapter is configured to receive a third optical signal from an external device and transmit the third optical signal to the optical signal transceiver connector; and
    the optical signal transceiver connector is configured to transmit the third optical signal to an optical engine of the communication device which demodulates the third optical signal into an electrical signal, and transmits the electrical signal to a switch chip of the communication device external to the housing, wherein the communication device is a switch.

* * * * *